(12) United States Patent
Osawa et al.

(10) Patent No.: US 7,251,362 B2
(45) Date of Patent: Jul. 31, 2007

(54) COLOR IMAGE PROCESSING APPARATUS

(75) Inventors: Kenro Osawa, Hachioji (JP); Nagaaki Ohyama, Kawasaki (JP); Masahiro Yamaguchi, Yokohama (JP); Takashi Obi, Yokohama (JP); Yuri Ohya, Tokyo (JP)

(73) Assignee: Olympus Optical Co., Ltd., Tokyo (JP)

( * ) Notice: Subject to any disclaimer, the term of this patent is extended or adjusted under 35 U.S.C. 154(b) by 54 days.

(21) Appl. No.: 11/272,609

(22) Filed: Nov. 14, 2005

(65) Prior Publication Data

US 2006/0061841 A1 Mar. 23, 2006

Related U.S. Application Data

(62) Division of application No. 10/395,350, filed on Mar. 24, 2003, now Pat. No. 7,010,162, which is a division of application No. 09/152,974, filed on Sep. 14, 1998, now Pat. No. 6,549,653.

(30) Foreign Application Priority Data

Sep. 16, 1997 (JP) .................................. 9-250975

(51) Int. Cl.
*G06K 9/00* (2006.01)
(52) U.S. Cl. ...................... 382/167; 358/504
(58) Field of Classification Search ........ 382/162–167, 382/305–306; 358/1.9, 504, 509, 515, 518–527; 345/589–604; 348/222.1–223.1, 231.99, 348/231.1
See application file for complete search history.

(56) References Cited

U.S. PATENT DOCUMENTS

| | | | |
|---|---|---|---|
| 5,805,213 A | 9/1998 | Spaulding et al. | |
| 5,852,675 A * | 12/1998 | Matsuo et al. | 382/167 |
| 5,864,364 A | 1/1999 | Ohyama et al. | |
| 5,956,015 A | 9/1999 | Hino | |
| 6,043,909 A | 3/2000 | Holub | |
| 6,075,563 A | 6/2000 | Hung | |
| 6,081,254 A | 6/2000 | Tanaka et al. | |

(Continued)

FOREIGN PATENT DOCUMENTS

JP 09-172649 A 6/1997

OTHER PUBLICATIONS

Journal of Imaging Science and Technology, vol. 40, No. 5, Sep. Oct. 1996, pp. 422-430, "Principal Component Analysis of Skin Color and its Application to Colormetric Color Reproduction on CRT Display and Hardcopy".

(Continued)

*Primary Examiner*—Ishrat Sherali
(74) *Attorney, Agent, or Firm*—Frishauf, Holtz, Goodman & Chick, P.C.

(57) ABSTRACT

A color image processing apparatus reproduces color data of a subject at higher accuracy by estimating the spectral reflectance of the subject from the color chip basis function $vn(\lambda)$ which can expand the spectral reflectances of all color chips of the reference chart and the expansion coefficients B of the color chips. The color image processing apparatus uses an image processing device to which a subject shooting signal Q shot by the color image input device and a reference chart shooting signal G taken from a plurality of color chips each having a spectral reflectance, is known.

20 Claims, 14 Drawing Sheets

U.S. PATENT DOCUMENTS

| | | |
|---|---|---|
| 6,466,334 B1 | 10/2002 | Komiya et al. |
| 6,549,653 B1 | 4/2003 | Osawa et al. |
| 6,734,899 B1 * | 5/2004 | Okamoto .................... 348/188 |
| 6,766,050 B1 * | 7/2004 | Saikawa et al. ............ 382/162 |

OTHER PUBLICATIONS

"A Generalised Method For Spectral Scanner Characterisation" by Lindsay W. MacDonald and M. Ronnier Luo, Color Image Science, Exploiting Digital Media, pp. 116-131, 2002, John Wiley & Sons Ltd.

Gauraw Sharma and H. Joel Trussell, "Set Theroretic Estimation in Color Scanner Characterization", Journal of Electronic Imaging, vol. 5(4), pp. 479-489, Oct. 1996.

Chang et al. "A Color Constancy Model for Advanced Television Cameras" IEEE transaction on Broadcasting vol. 38, No. 2, Abstract and pp. 90-97, Jun. 1992.

Ho et al. "Separating a Color Signal into Illumination and Surface Reflectance Components: Theory and Applications" IEEE transactions on Pattern Analysis and Machine Intelligence vol. 12, No. 10, Abstract and pp. 966-977, Oct. 1990.

* cited by examiner

COLOR IMAGE PROCESSING APPARATUS

This is a division of application Ser. No. 10/395,350 filed Mar. 24, 2003, now U.S. Pat. No. 7,010,162, which is a division of application Ser. No. 09/152,974 filed on Sep. 14, 1998, now U.S. Pat. No. 6,549,653 issued on Apr. 15, 2003.

BACKGROUND OF THE INVENTION

The present invention relates to a color image processing apparatus which estimates the spectral reflectance of an object to be shot, from a color image signal.

As the color imaging apparatus becomes more popular, it becomes more important to reproduce the original color of an object exactly using an image display apparatus such as a CRT monitor or a printing device such as a printer, from a color image signal acquired by a color image signal input device (to be referred to simply as an "input device" hereinafter) such as a color scanner or a digital camera.

Further, as networks connecting a plurality of devices via wiring are widely used, the accurate transmission of the color data of a color image signal and reproduction of color are becoming more important technical factors for establishing systems for remote medical check-ups and examinations in the field of telemedicine or electronic shopping, which are expected to significantly expand from now.

In order to establish a system capable of reproducing an accurate color, it is firstly required to estimate the color data of an object accurately from a color image signal obtained from an input device.

As a method of dealing with color quantitatively, the values of XYZ color system which is represented by the following equation (1) using functions of wavelength $\lambda$, $x(\lambda)$, $y(\lambda)$ and $z(\lambda)$, corresponding to the spectral sensitivities of human vision, which is called as color matching function as defined by Commission International de l'Eclairage (CIE), and the spectrum of an object $w(\lambda)$, or a uniform color space based on the XYZ color system are widely used.

$$X = K \int_{\lambda=380}^{780} x(\lambda)w(\lambda)d\lambda$$
$$Y = K \int_{\lambda=380}^{780} x(\lambda)w(\lambda)d\lambda$$
$$Z = K \int_{\lambda=380}^{780} z(\lambda)w(\lambda)d\lambda$$
(1)

In the above equation, K is a constant. In order to obtain color data of an object accurately from a color image signal, it is essential to accurately estimate XYZ values of an object under illumination of observation-site from the color image signal. In the case where the illumination used for acquiring the color image signal and the illumination of observation-site are equal to each other, the problem is to estimate the XYZ values of the object under the illumination used for acquiring the color image signal.

In this case in order to accurately obtain the XYZ values of an arbitrary object under the illumination used for obtaining a color image signal, it is required that the spectral sensitivities of the input device and the color matching functions should have a linear conversion relationship.

It is well known that the color image signal of an arbitrary object can be accurately converted to XYZ values by linear conversion only if the above condition called a Luther condition is satisfied.

The conversion relationship can be obtained from the relationship between the spectral sensitivities of the input device and the color matching functions; however it can be indirectly obtained from the relation between color image signals of three or more objects having independent XYZ values, and measured XYZ values.

Usually, it is very difficult to accurately measure the spectral sensitivities of the input device, and therefore the conversion relationship from color image signals to XYZ values is usually obtained by the latter method.

In the case where the spectral sensitivities of the input device do not satisfy the Luther condition in a strict sense, accurate XYZ values cannot be obtained from a color image signal for an arbitrary object. However, with regard to the specific object, the conversion relationship can be obtained by a way of least square method from the relationship between the color image signals and XYZ values for a number of colors of objects.

The format of the color chart used as the object for obtaining color data from a color image signal acquired by the input device, is standardized by ISO IT8.7, and provided by several film makers.

In order to obtain the color data of an object under illumination of observation-site different from the illumination of shooting-site used for acquiring a color image signal with respect to an arbitrary object, the product of the spectral sensitivities of the input device and the shooting-site illumination spectrum, and the product of the color matching functions and the observation-site illumination spectrum must have the relationship of linear conversions.

Such a condition depends upon the illumination spectrum, and therefore it is not practical in general. Consequently, in order to estimate the color data of an object under illumination different from that of shooting-site, it is necessary to obtain the spectral reflectance of the object.

For an accurate estimation of the spectral reflectance of an object, the method of obtaining the spectral reflectance of an object by estimating the spectrum from a lot of multi-channel images acquired by the spectral sensitivities of narrow bands, and dividing the estimated spectrum by illumination spectrum can be proposed as disclosed in, for example, Jpn. Pat. Appln. KOKAI Publication No. 9-172649.

Further, as disclosed in the Journal of Imaging Science and Technology Vol. 40, No. 5, Sep./Oct. 1996, p422–p430, in the case where objects to be shot are limited to particular subjects such as human skin and the spectral reflectance is represented by a linear combination of a small number of basis functions, it becomes possible to estimate the spectral reflectance from color image signals the band number of which is equal to or more than the number of basis functions representing the spectral reflectance of the object.

In these methods, the data of the spectrum of the illumination used to acquire the color image signal is necessary in addition to the spectral sensitivities of the input device.

However, it is difficult for the operator to accurately measure the spectral sensitivities of the input device. In consideration of a difference between individual input devices, change along with time or the like, the accuracy of the data provided by the maker of the device is not always sufficient.

Further, in order to obtain the data of the spectrum of the illumination for the shooting environment, a measurement device such as a spectrophotometer is required when shooting, and therefore these method cannot be easily applied to a system which employs a conventional color image input device.

BRIEF SUMMARY OF THE INVENTION

The object of the present invention is to provide a color image processing device capable of estimating the spectral reflectance of an object to be shot from the color image signal of the object acquired by a color image signal input device, even if the spectral sensitivities of the color image signal input device, or the spectrum of the illumination used when the color image signal is input are unknown.

According to the present invention, there is provided a color image processing device including image processing means for subjecting an image signal input of an object to be shot, to a predetermined image processing, so as to be able to reproduce color data of the object, wherein the image processing means carries out the process of reproducing the color data of the object, by estimating the spectral reflectance of the object using the color image signal of a reference object the spectral reflectance of which is known, the color image signal of an object acquired by the same illumination condition as that for acquiring the color image signal of the reference object, and the spectral reflectance data of the reference object.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

Figure 1:
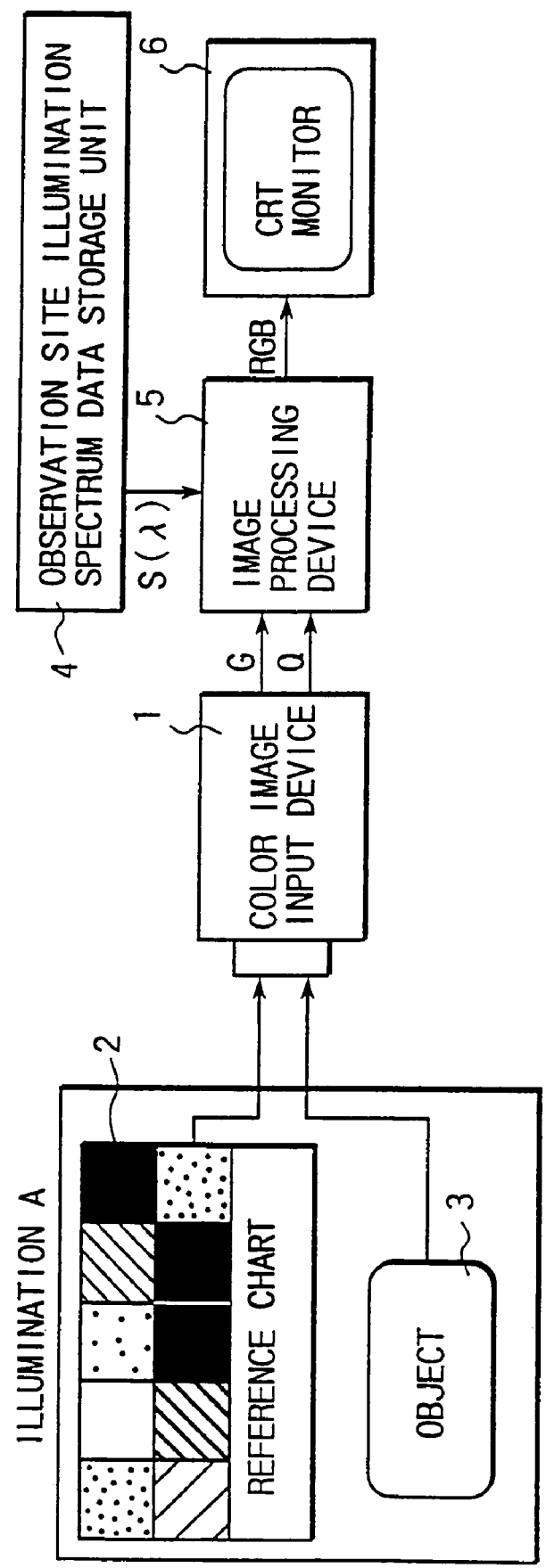
FIG. 1 is a diagram showing a structure of a color image processing device according to the first embodiment of the present invention.

Embodiments of the present invention will now be described with reference to drawings.

First, the concept of a color image processing device according to the present invention will be provided.

According to the present invention, the spectral reflectance of an object is estimated from the spectral reflectance of reference objects whose spectral reflectances are known a priori and color image signal values of the reference objects and color image signal values of the object whose spectral reflectance is not known acquired from the color image signal input device (to be called simply "input device" hereinafter).

A method of estimating the spectral reflectance of an object from a color image, using such an input device will now be described in connection with an example case of a camera having the L-number of independent spectral sensitivities (bands).

Let us suppose here that the spectral sensitivity of the k-th band of the camera is represented by $h^k(\lambda)$ (k=1 to L), the spectrum of the illumination for shooting is represented by $S(\lambda)$, and the spectral reflectance of the object is represented by $p(\lambda)$, and $p(\lambda)$ can be expanded by the L-number of basis functions $el(\lambda)$ (l=1 to L).

A signal value $q^k$ obtained by shooting an object under the shooting-site illumination at the k-th camera sensitivity, is given by the following formula supposing that the sensitivity of the camera makes a linear response to the intensity of incident light:

$$q^k = \int p(\lambda)s(\lambda)h^k(\lambda)d\lambda \qquad (2)$$

Here, since the spectral reflectance $p(\lambda)$ of an object can be expanded into the L-number of basis functions $el(\lambda)$ (l=1 to L), $p(\lambda)$ is given by formula (3) using expansion coefficients $cl$ (l=1 to L).

$$p(\lambda) = \sum_{l=1}^{L} c_l e_l(\lambda) \qquad (3)$$

Therefore, formula (2) can be rewritten as:

$$q^k = \sum_{l=1}^{L} c_l a_l^k \quad (4)$$

expect that:

$$a_l^k = \int e_l(\lambda) s(\lambda) h^k(\lambda) d\lambda \quad (5)$$

The signal values represented by equation (4) are obtained for the L-number of the sensitivities of the camera, the following matrix equation (6) is given:

$$\begin{pmatrix} q^1 \\ q^2 \\ \dots \\ q^L \end{pmatrix} = \begin{pmatrix} a_1^1 & a_2^1 & \dots & a_L^1 \\ a_1^2 & a_2^2 & \dots & a_L^2 \\ \dots \\ a_1^L & a_2^L & \dots & a_L^L \end{pmatrix} \begin{pmatrix} c_1 \\ c_2 \\ \dots \\ c_L \end{pmatrix} \quad (6)$$

The matrices of the equation (6) are represented by Q, A and C, respectively to give:

$$Q = AC \quad (7)$$

Then, the estimated vector C of the expansion coefficient cl (l=1 to L) of each basis function of spectral reflectance of the object is given by the following formula.

$$C = A^{-1} Q \quad (8)$$

In the formula (8), Q is a matrix known by measurement, and therefore when A is available, the value for C can be obtained. When C is obtained, it becomes possible to obtain the spectral reflectance p(λ) of the object from the formula (3).

In order to obtain the value for A, the M-number of color chips whose spectral reflectances are known are shot. Suppose that the spectral reflectance of the m-th color chip is represented by fm(λ) (m=1 to M). If the spectral reflectance fm(λ) of the color chips can be expanded by the M-number of basis functions vn(λ) (n=1 to M), fm(λ) can be given with use of expansion coefficient bmn (n=1 to M), by:

$$f_m(\lambda) = \sum_{n=1}^{M} b_{mn} v_n(\lambda) \quad (9)$$

The shooting signal value $g^k{}_m$ of the m-th color chip by the k-th camera sensitivity, is given by:

$$g_m^k = \int f_m(\lambda) s(\lambda) h^k(\lambda) d\lambda \quad (10)$$

From the formulas (9) and (10), the formula (11) is given by:

$$g_m^k = \sum_{n=1}^{M} b_{mn} d_n^k \quad (11)$$

expect that:

$$d_n^k = \int v_n(\lambda) s(\lambda) h^k(\lambda) d\lambda \quad (12)$$

The signal value represented by equation (11) is obtained for the L-number of the sensitivities of the camera, the following matrix equation (13) is given:

$$\begin{pmatrix} g_1^1 & g_2^1 & \dots & g_M^1 \\ g_1^2 & g_2^2 & \dots & g_M^2 \\ \dots \\ g_1^L & g_2^L & \dots & g_M^L \end{pmatrix} = \begin{pmatrix} d_1^1 & d_2^1 & \dots & d_M^1 \\ d_1^2 & d_2^2 & \dots & d_M^2 \\ \dots \\ d_1^L & d_2^L & \dots & d_M^L \end{pmatrix} \begin{pmatrix} b_{11} & b_{21} & \dots & b_{M1} \\ b_{12} & b_{22} & \dots & b_{M2} \\ \dots \\ b_{1M} & b_{2M} & \dots & b_{MM} \end{pmatrix} \quad (13)$$

The matrices of the equation (13) are represented by G, D and B, respectively to give:

$$G = DB \quad (14)$$

From the equation (14), D can be given by:

$$D = GB^{-1} \quad (15)$$

In the formula (15), since G is a measurement data and B is an expansion coefficient data corresponding to the basis functions of the pre-obtained spectral reflectances of the color chips, D can be obtained.

Next, when the basis function el(λ) (l=1 to L) of the spectral reflectance of the object is expanded by the basis functions vn(λ) (n=1 to M) of the spectral reflectances of the color chips, the basis function el(λ) can be represented by the following formula using the expansion coefficient Oln.

$$e_l(\lambda) \sum_{n=1}^{M} o_{ln} v_n(\lambda) + \delta_l(\lambda) \quad (16)$$

In the above equation, δl(λ) is an expansion error. When the formula (16) is substituted with the formula (5), the following formula is given:

$$a_l^k = \int \left\{ \sum_{n=1}^{M} o_{ln} v_n(\lambda) + \delta_l(\lambda) \right\} s(\lambda) h^k(\lambda) d\lambda \quad (17)$$

$$= \sum_{n=1}^{M} o_{ln} \int v_n(\lambda) s(\lambda) h^k(\lambda) d\lambda + \int \delta_l(\lambda) s(\lambda) h^k(\lambda) d\lambda$$

$$= \sum_{n=1}^{M} o_{ln} d_n^k + \Delta_l^k$$

If the formula (17) is represented as:

$$A = DO + \Delta \quad (18)$$

In this equation, if term Δ created by expansion error δl(λ) can be neglected, the estimated vector A' of A is given by:

$$A' = DO \quad (19)$$

The estimated vector C' of the expansion coefficient vector C of each basis function of the spectral reflectance of the object is given by:

$$C' = A'^{-1} Q \quad (20)$$
$$= (DO)^{-1} Q$$
$$= (GB^{-1} O)^{-1} Q$$

In this formula (20), Q represents a shooting signal of an object, O represents an expansion coefficient obtained by expanding the basis functions of the spectral reflectance of the object by the basis functions of the spectral reflectances of the color chips, B represents the expansion coefficient of the basis function of each spectral reflectance of the color chips, and G represents a shooting signal of the color chips.

By shooting a color chips whose spectral reflectances are known, G is obtained. Thus, from the formula (20), with values of an expansion coefficient B of the basis functions of each spectral reflectance of the color chips which are obtained in advance, an expansion coefficient O of the basis functions of the spectral reflectances of an object which is calculated in advance and a shooting signal Q of an object, the expansion coefficient of the basis functions for the spectral reflectance of an object can be obtained. Then, from the basis functions for the spectral reflectance of the object and the expansion coefficient C, the spectral reflectance of the object is calculated.

In particular, when the basis functions el(λ) of the spectral reflectance of an object and the basis functions vn(λ) of color chips coincide with each other, O becomes a unit matrix, and the estimated vector C' of C is given by:

$$C'=(GB^{-1})^{-1}Q \quad (21)$$

As represented by the formula (21), when the basis functions for the spectral reflectances of the color chips and the basis function of the spectral reflectance of the object coincide with each other, the spectral reflectance of the object can be obtained from the shooting signal Q of the signal using a color chip shooting image signal G shot by a camera having the same number of bands as the number of the basis functions.

When the spectral reflectance of an object can be expanded by the basis functions of the color chips, the spectral reflectance of the object can be obtained as a linear combination of the basis functions of the spectral reflectances of the color chips, by rendering C' of the formula (21) the expansion coefficient of the basis functions of the spectral reflectance of the color chips.

In this case, even if the basis functions of the spectral reflectance of an object is not known, the spectral reflectance of an object can be obtained by a camera having bands whose number is equal to or more than that of the basis functions of the spectral reflectances of the color chips. Further, if the basis functions of the spectral reflectances of the object are known, and it can be expanded by the basis functions of the spectral reflectances of the color chips, the spectral reflectance of the object can be obtained by the formula (20) from the shooting signal Q of the object, using the color chip shooting image signal G taken by a camera having bands whose number is equal to or more than that of the basis functions of the object.

Next, it is the case where different illumination conditions are used for the shooting of the color chips and the object.

When the illumination spectrum at the shooting of an object is So(λ), the formula (2) can be rewritten as:

$$q^k=\int p(\lambda)s_o(\lambda)h^k(\lambda)d\lambda \quad (22)$$

Further, the formula (5) can be expressed as:

$$a_l^k=\int e_l(\lambda)s_o(\lambda)h^k(\lambda)d\lambda \quad (23)$$

When the illumination spectrum at the shooting of color chips is Sc(λ), the formula (10) can be rewritten as:

$$g_m^k=\int f_m(\lambda)s_c(\lambda)h_k(\lambda)d\lambda \quad (24)$$

Further, the formula (12) can be expressed as:

$$d_n^k=\int v_n(\lambda)s_c(\lambda)h^k(\lambda)d\lambda \quad (25)$$

When $$e'_l(\lambda)=e_l(\lambda)s_o(\lambda) \quad (26)$$

$$v'_n(\lambda)=v_n(\lambda)s_c(\lambda) \quad (27)$$

and el'(λ) is expanded by vn'(λ), el'(λ) can be represented, with use of expansion coefficient O'ln, as:

$$e'_l(\lambda) = \sum_{n=1}^{M} o'_{ln}v'_n(\lambda) + \delta'_l(\lambda) \quad (28)$$

From the formulas (28) and (23), $$\begin{aligned} a_l^k &= \int e_l(\lambda)s_o(\lambda)h^k(\lambda)d\lambda \\ &= \int e'_l(\lambda)h^k(\lambda)d\lambda \\ &= \int \left\{ \sum_{n=1}^{M} o'_{ln}v'_n(\lambda) + \delta'_l(\lambda) \right\} h^k(\lambda)d\lambda \\ &= \sum_{n=1}^{M} o'_{ln}\int v'_n(\lambda)h^k(\lambda)d\lambda + \int \delta'_l(\lambda)h^k(\lambda)d\lambda \\ &= \sum_{n=1}^{M} o'_{ln}d_n^k + \Delta'_l \end{aligned} \quad (29)$$

is given. The formula (29) can be rewritten as:

$$A=DO'+\Delta \quad (30)$$

In this equation, if term Δ' created by expansion error δ'l(λ) can be neglected, the estimated vector A' of A is given by:

$$A'=DO' \quad (31)$$

The estimated vector C' of the expansion coefficient vector C of each basis function of the spectral reflectance of the object is given by:

$$\begin{aligned} C' &= A'^{-1}Q \\ &= (DO')^{-1}Q \\ &= (GB^{-1}O')^{-1}Q \end{aligned} \quad (32)$$

In this formula (32), Q represents a shooting signal of an object, O' represents an expansion coefficient obtained by expanding the product of the basis functions of the spectral reflectance of an object and the object shooting-site illumination spectrum, of the formula (28) by the products of the basis functions of the color chips and the color chip shooting-site illumination spectrum, B represents the expansion coefficient of the basis function of each spectral reflectance of the color chips, and G represents a shooting signal of the color chips.

By shooting color chips whose spectral reflectances are known, G is obtained. Thus, from the formula (32), with values of an expansion coefficient B of the basis functions of each spectral reflectance of the color chips which are obtained in advance, a pre-calculated O' and a shooting signal Q of an object, the expansion coefficients of the basis functions for the spectral reflectance of an object can be obtained.

Then, the spectral reflectance of the object can be calculated from its basis functions and expansion coefficients.

With the present invention, even in the case where the spectral sensitivities of the camera and the spectrum of the shooting-site illumination are unknown, the spectral reflectance of an object is estimated from the shooting signal of the object, having the basis functions of the spectral reflectance, by which the basis function of the spectral reflectance of the object can be expanded.

Further, even in the case where the illumination condition for shooting the color chips and the illumination condition for shooting the object are different from each other, the spectral reflectance of the object can be estimated from the shooting signal of the object if the color chip shooting-site illumination spectrum and object shooting-site illumination spectrum are known.

In the estimation of the spectral reflectance of an object described above, there are conditions which the spectral reflectances of color chips in reference object whose spectral reflectance are known must satisfy in order to accurately estimate the spectral reflectance of the object. By forming in advance an object which satisfies these conditions, more accurate estimation of the spectral reflectance can be performed than in the case where a conventional reference object is used.

In connection with the above-described spectral reflectance estimating method, it is explained that the number of basis functions of the spectral reflectances of the color chips whose spectral reflectance are known, coincides with that of color chips; however a method similar to this can be applied to cases where they are different.

Further, it is supposed in the above description that the number of basis functions of spectral reflectances of an object and the number of bands of the input device coincide with each other; however this method can be expandable for cases where these numbers are different from each other. For example, as in the case of an ordinary digital camera, the method can be applied to a 3-band input device.

As a reference object whose spectral reflectance is known, the color chip has been discussed as an example; however arbitrary objects can be applied to this method as long as they have spectral reflectances similar to those of the color chips.

FIG. 1 is a diagram showing an example of the structure of a color image processing apparatus according to the first embodiment of the present invention, which will now be described.

The apparatus of this embodiment, includes a color image input device (input device) 1, a reference chart 2 and an object 3, arranged under the same illumination A, an observation-site illumination spectrum data storage unit 4, an image processing device 5 and a CRT monitor 6.

The image processing device 5 shoots the reference chart 2 and the object 3 arranged under the same illumination A in order or at the same time by the input device 1. Further, the spectral reflectance and XYZ values of the object 3 are estimated from the image signals G and Q output, and the basis functions and expansion coefficients data of the reflectances of color chips, and color matching functions data, which are present in advance within the image processing device, and thus RGB signals are output. The RGB signals are displayed on the CRT monitor 6 as a color image of the object.

In this embodiment, the XYZ values under the observation-site illumination are obtained from the spectral reflectance of the object, which is estimated by the image processing device 5, and further the data is displayed on the CRT monitor as a color image. However, the present invention is not limited to this embodiment, but is applicable to the system including display devices such as a liquid crystal display device and a plasma display, and a printing device such as a color printer. Further, it is possible to store the spectral reflectance and XYZ values as data.

With the color image processing apparatus having the above-described structure, if the reference chart 2 and the object 3 are shot at the same time by the input device 1, the image signal of the reference chart 2 is extracted from the object shooting signal by a reference chart extracting device (not shown) in the image processing device 5.

The input device 1 forms an image on a semiconductor imaging device such as a CCD 104, from the transmitted light through a camera lens 1 and one of a plurality of interference filters 103 mounted on the filter turret 102.

Figure 5A:
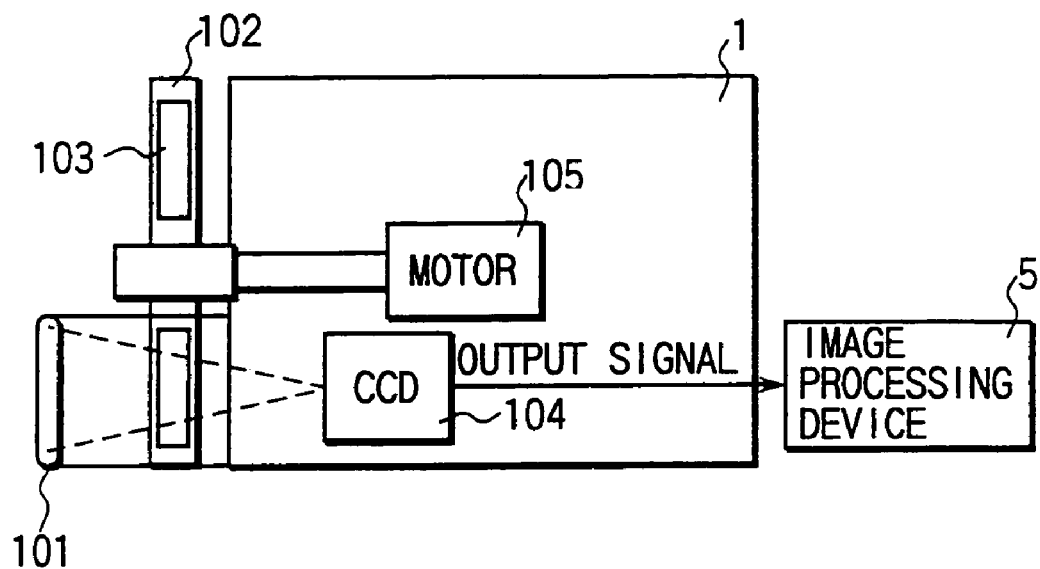
FIG. 5A is a diagram showing a structure of the color image input device shown in FIG. 1.
Figure 5B:
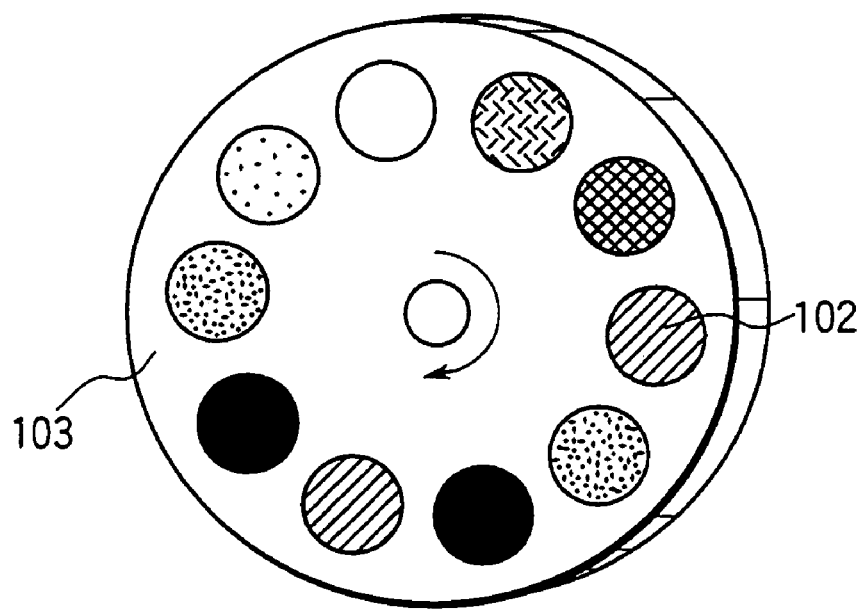
FIG. 5B is a diagram showing a structure of a filter turret to which interference filters are mounted and which are built in the color image input device.

These interference filters 103 are mounted on the filter turret 102 having a circular shape, as schematically shown in FIG. 5B. As the filter turret 102 is rotated by the motor 105, each of the interference filters 103 is mounted on the rear surface of the camera lens 101 in order, and an image of the corresponding band is shot by the CCD 104. The CCD 104 has the pixel number of, for example, 640 pixels×480 pixels. Naturally, the present invention is not limited to this pixel number.

The output signal of an image shot by the CCD 104 is sent to the image processing device 5.

Figure 7:
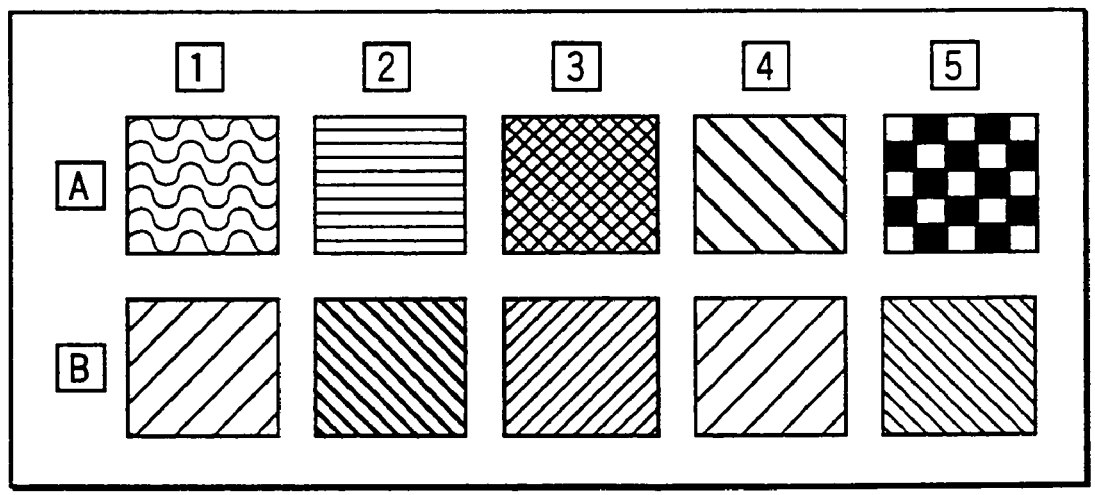
FIG. 7 is a diagram showing an example of a reference chart used in the present invention.

FIG. 7 shows an example of the reference chart 2. The reference chart 2 consists of 10 color chips, and the spectral reflectance of each color chip can be expanded by 10 basis functions which are independent from each other. The image signals G and Q acquired by the input device 1 are input to the image processing device 5 as 10 channels image data having a pixel size of 640 pixels×480 pixels of 10-bits per pixel.

TO the image processing device 5 to which the image signals G and Q have been input, observation-site illumination spectrum data is input from the observation-site illumination spectrum data storage unit 4. The observation-site illumination spectrum data consists of light intensity values of observation-site illumination taken at an interval of 1 nm, in a wavelength range from 380 nm to 780 nm.

In the image processing device 5, the spectral reflectance and the XYZ values of the object are estimated from these input data, and the color chip basis function data, color chip expansion coefficient data and color matching functions data, which are pre-stored in the image processing device. Further, the image processing device 5 converts, on the basis of the characteristics data of the CRT monitor 6, the XYZ values of the object 3 taken under the observation-site illumination into RGB signals to be displayed on the monitor screen, and outputs the signals to the CRT monitor 6.

As the RGB signals output from the image processing device are input to the CRT monitor 6, the CRT monitor 6 displays the color image of the object.

Next, the structure of the image processing device 5 of this embodiment will now be described with reference to FIG. 2.

The image processing device 5 consists mainly of a spectral reflectance calculating unit 7, a tristimulus value calculating unit 8 and an RGB value calculating unit 9.

The spectral reflectance calculating unit 7 comprises a color chip shooting signal storage unit 11, a color chip expansion coefficient storage unit 12, an object expansion coefficient calculating unit 10, a color chip basis function storage unit 14 and a spectral reflectance calculating unit 13 for calculating a spectral reflectance $p(\lambda)$.

The color chip shooting signal storage unit 11 calculates, from the shooting image of the reference chart containing a plurality of color chips, the average values of shooting signal values corresponding to the color chips, for an appropriate region, and stores them as color chip shooting signals. The color chip expansion coefficient storage unit 12 stores expansion coefficients corresponding to basis functions of the spectral reflectances of the color chips in the reference chart, which are obtained in advance.

The object expansion coefficient calculating unit 10 calculates an expansion coefficient C of the spectral reflectance of an object from the object shooting signal input from the color image input device 1, the color chip shooting signal G input from the color chip shooting signal storage unit 11 and the expansion coefficient B input from the color chip expansion coefficient storage unit 12.

Further, the color chip basis function storage unit 13 stores color chip basis functions $vn(\lambda)$ (n=1 to 10), and the spectral reflectance calculating unit 13 calculates the spectral reflectance $p(\lambda)$ of an object from the expansion coefficient C calculated by the object expansion coefficient calculating unit 10 and the basis functions $vn(\lambda)$ (n=1 to 10) of the object output from the color chip basis function storage unit 14.

Figure 3:
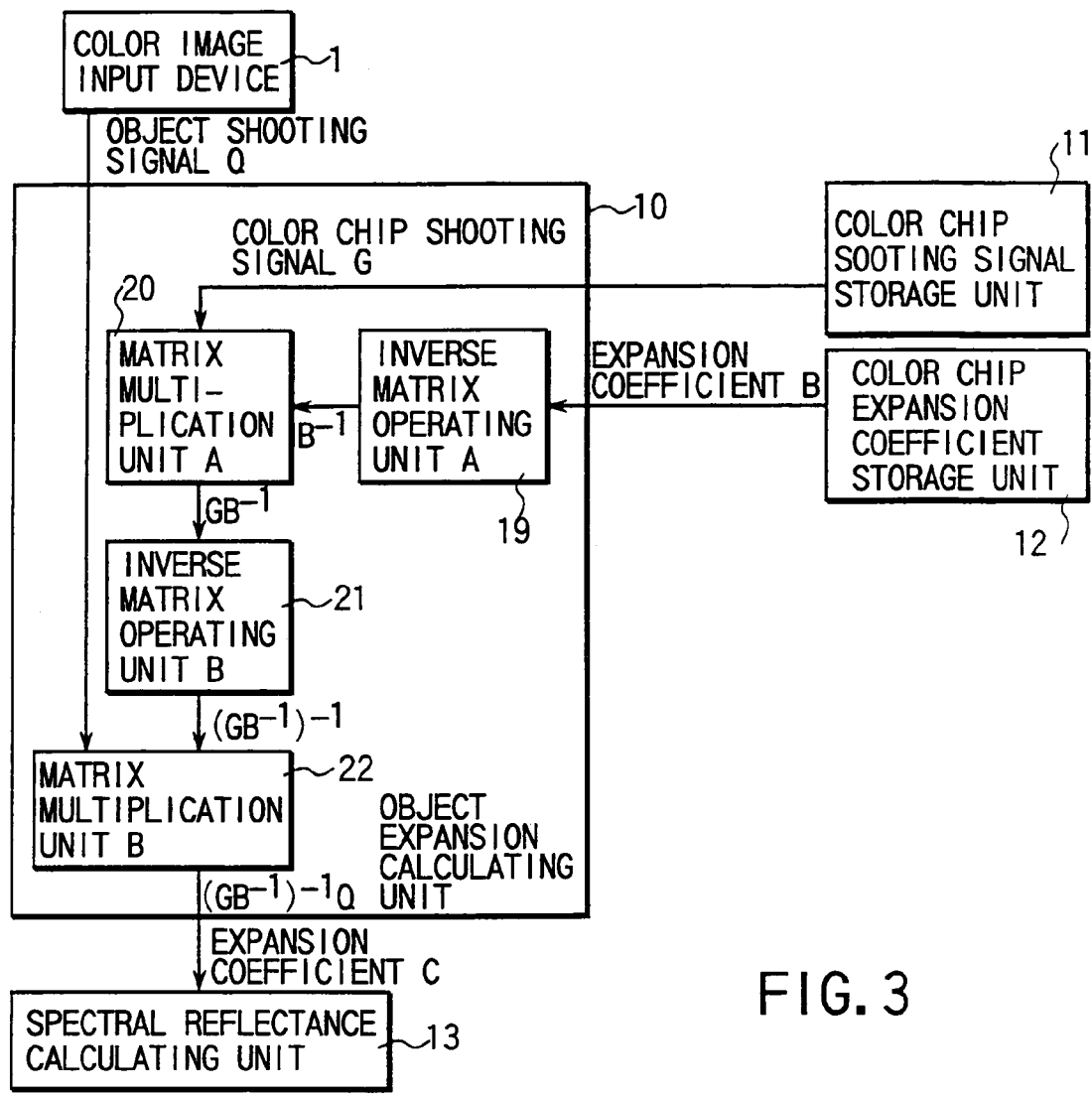
FIG. 3 is a diagram showing a structure of an object expansion coefficient calculating unit shown in FIG. 2.

FIG. 3 shows the structure of the object expansion coefficient calculating unit 10, which will now be described.

An inverse matrix $B^{-1}$ of the expansion coefficient B calculated by an inverse matrix operating unit A19, from the expansion coefficient B input from the color chip expansion coefficient storage unit 12, and a color chip shooting signal G input from the color chip shooting signal storage unit 11 are input to a matrix multiplication unit A20, and thus a matrix $(GB^{-1})$ is calculated. The calculated $GB^{-1}$ is input to an inverse matrix operating unit B21 to obtain an inverse matrix thereof $(GB^{-1})^{-1}$, which is input to a matrix multiplication unit B22. To the matrix multiplication unit B22, the object shooting signal Q is further input, and the expansion coefficient $C=(GB^{-1})^{-1}Q$ is calculated from $(GB^{-1})^{-1}$ output from the inverse matrix operating unit B21.

Figure 4:
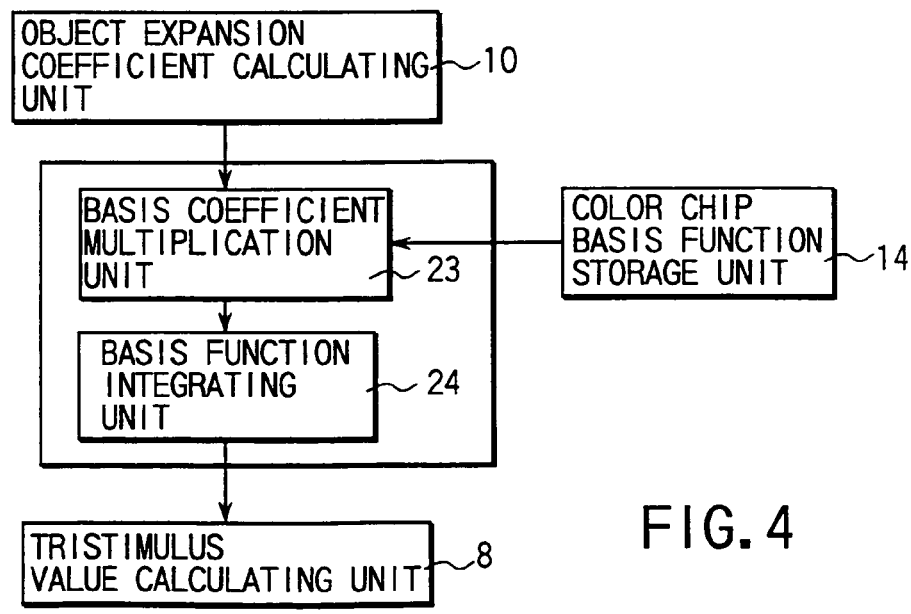
FIG. 4 is a diagram showing a structure of a spectral reflectance calculating unit shown in FIG. 2.

FIG. 4 shows the structure of the spectral reflectance calculating unit 13, which will now be described.

The spectral reflectance calculating unit 13 consists of a basis coefficient multiplication unit 23 for multiplying an object expansion coefficient C corresponding to a color chip basis function $vn(\lambda)$, and a basis function integrating unit 24 for calculating the spectral reflectance.

The basis coefficient multiplication unit 23 obtains, by multiplication, the product of object expansion coefficients $C=Cn$ (n=1 to 10) corresponding to the color chip basis functions $vn(\lambda)$, from the object expansion coefficient C input from the object expansion coefficient calculating unit 10 and the color chip basis function $vn(\lambda)$ input from the color chip basis function storage unit 14, and thus obtained result is output to the basis function integrating unit 24.

The basis function integrating unit 24 adds up the data input from the basis coefficient multiplication unit 23 at all the wavelengths in terms of all the basis functions $cnvn(\lambda)$ (n=1 to 10), and thus the spectral reflectance is calculated.

Figure 2:
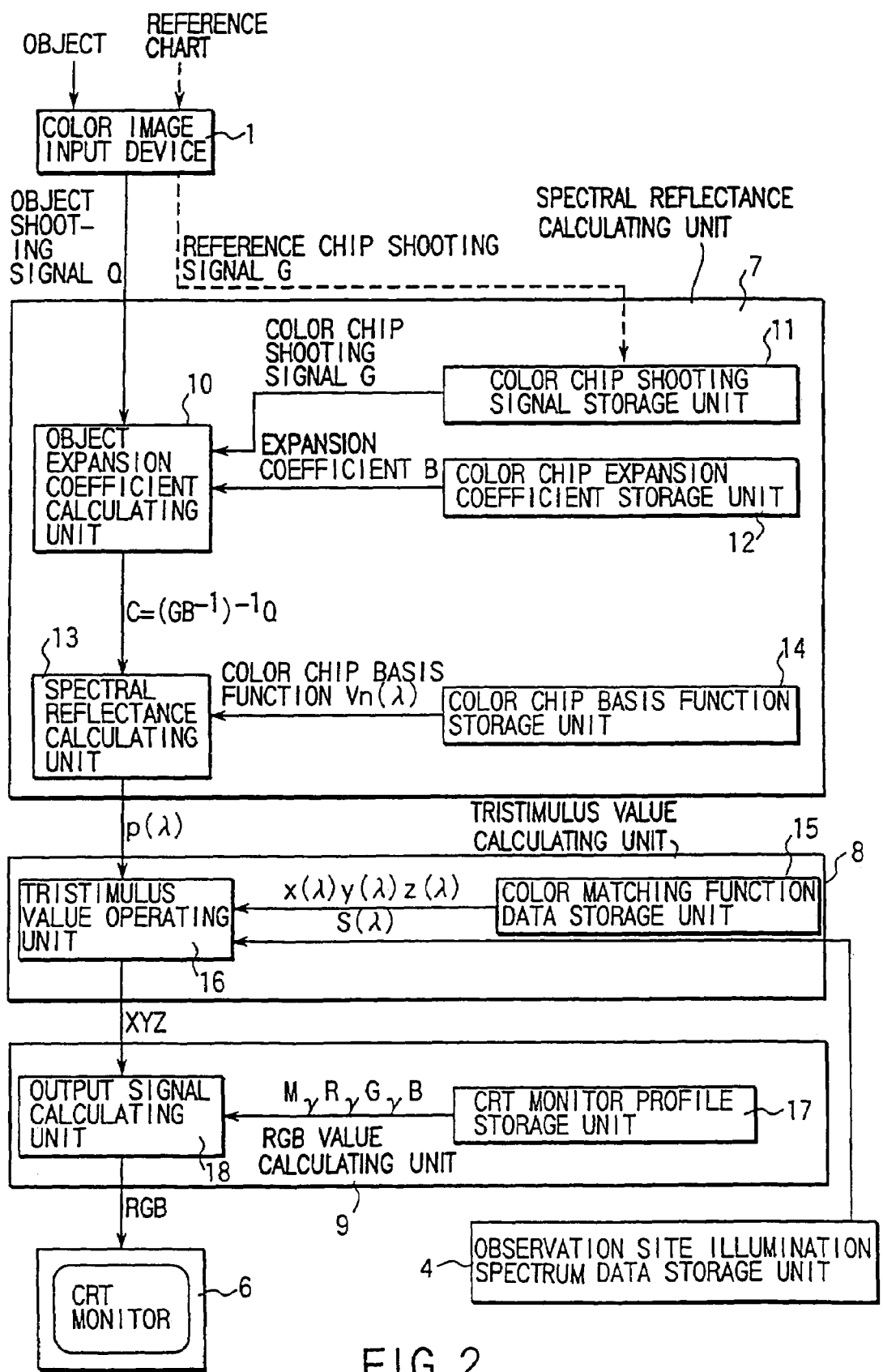
FIG. 2 is a diagram showing a detailed structure of an image processing device in the color image processing device according to the first embodiment.

In the tristimulus value calculating unit 8 shown in FIG. 2, the tristimulus value operating unit 16 calculates the tristimulus values XYZ under the illumination condition for observing an object, from the spectral reflectance of the object, calculated from the spectral reflectance calculating unit 7, the observation-site illumination input from the observation-site illumination spectrum data storage unit 4, and the color matching function data pre-stored in the color matching function data storage unit 15, and the values are output to the RGB value calculating unit 9.

Figure 6:
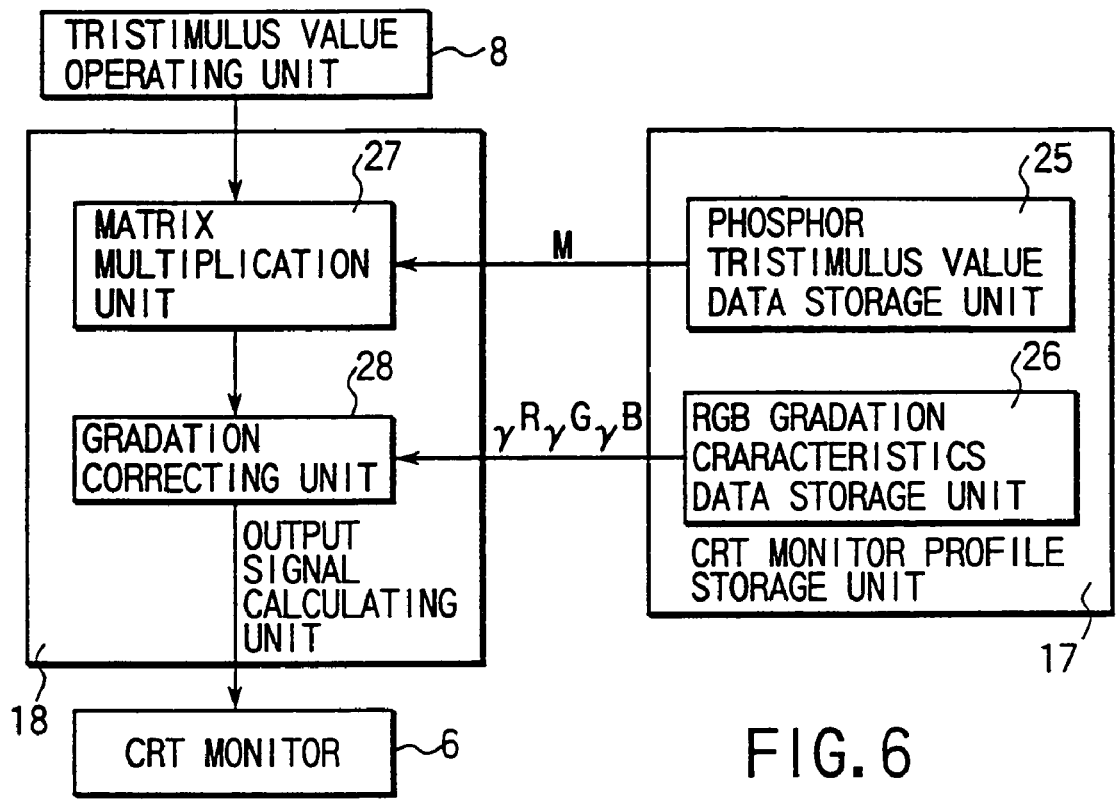
FIG. 6 is a diagram showing a structure of an RGB value calculating unit shown in FIG. 2.

The RGB value calculating unit 9, as shown in FIG. 6, comprises a CRT monitor profile storage unit 17 for storing the characteristics data of the display device and an output signal calculating unit 18 for converting the XYZ values to the monitor input signal RGB values using the characteristics data of the CRT monitor.

The characteristics data of the CRT monitor contains a matrix M stored in the phosphor tristimulus value data storage unit 25 and a gamma curve $\gamma^R\gamma^G\gamma^B$ stored in the RGB gradation characteristics data storage unit 26. The matrix M is a matrix made of elements of 3×3, and the gamma curves $\gamma^R\gamma^G\gamma^B$ is the output luminance value to each of the RGB input values.

In the RGB value calculating unit 9, the XYZ values calculated by the tristimulus value calculating unit 8 and the matrix M stored in the phosphor tristimulus value data storage unit 25 are multiplied by the matrix multiplication unit 27. Then, the gradation correcting unit 28 performs the correction of the gradation on the basis of the result of the multiplication and the gamma curves stored in the RGB gradation characteristics data storage unit 26, and thus the RGB signals are obtained by conversion.

Thus, the calculated RGB signals are input to the CRT monitor, and a color image of the object is displayed on the CRT monitor.

According to the first embodiment of the present invention, the spectral reflectance of an object is estimated from the object shooting signal Q and reference chart shooting signal G shot under the same illumination condition by the color image input device, and the color chip basis functions $vn(\lambda)$, which can expand the spectral reflectance of the spectral reflectance of all the color chips of the reference chart pre-stored, (that is, the spectral reflectance data of the object) and the expansion coefficients B of the color chips. Here, the conditions for being able to estimate the spectral reflectance of an object exactly are that the spectral reflectance of the object can be expanded by the color chip basis functions $vn(\lambda)$ of the reference chart and the color image input device has the number of bands which is equal to or more than that of color chip basis functions. With these conditions, the spectral reflectance of an object can be estimated even if the spectral sensitivities of the color image input device and the illumination spectrum used for shooting are unknown.

Figure 8:
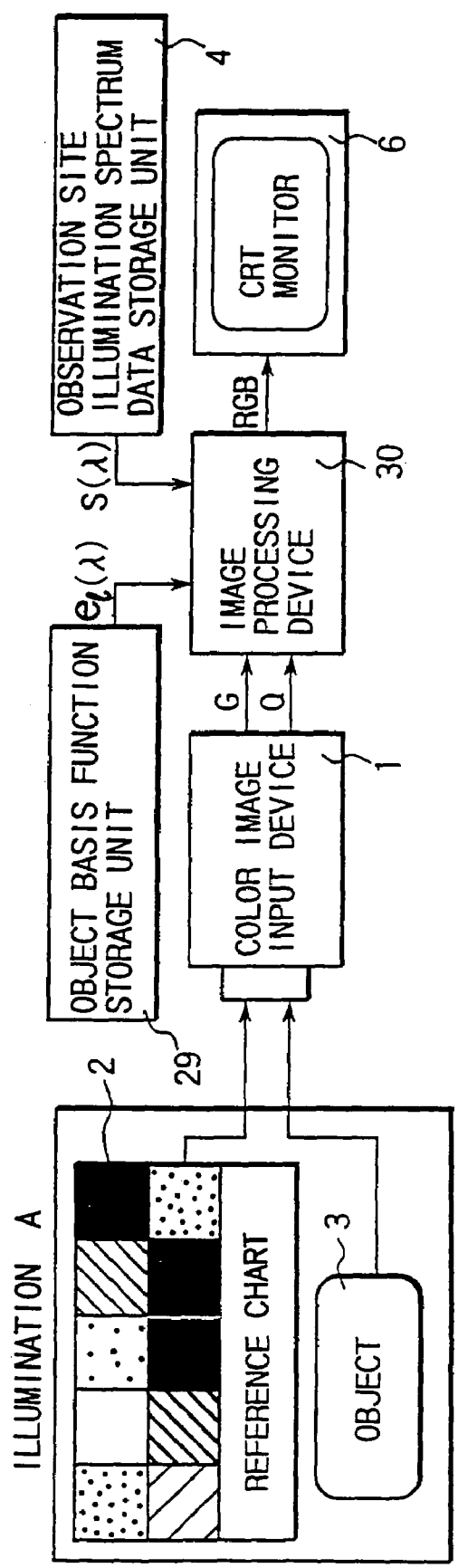
FIG. 8 is a diagram showing a structure of a color image processing device according to the second embodiment of the present invention.

FIG. 8 shows a color image processing apparatus according to the second embodiment of the present invention.

The apparatus of this embodiment consists of an input device 1 to which a color image is input by shooting, a reference chart 2 and an object 3, which are arranged under the same illumination A, an observation-site illumination spectrum data storage unit 4 for storing observation-site illumination spectrum data, an object basis function storage unit 29 for storing object basis function $el(\lambda)$, an image processing device 30 for outputting RGB signals and a CRT monitor 6 for displaying a color image.

The image processing device 30 shoots the reference chart 2 and object 3, which are exposed by the same illumination A sequentially or at the same time, by the input device 1, and estimates the spectral reflectance and XYZ values of the object 3 from the shooting signals G and Q of those shot respectively, and the color chip basis functions data, color chip expansion coefficients data and color matching functions data, pre-stored in the image processing device. Thus, the RGB signals are output. The RGB signals are displayed on the CRT monitor 6 as a color (RGB) image of the object.

The input device 1 is equivalent to the input device of the first embodiment described above, and a filter turret on which interference filters are arranged, as shown in FIGS. 5 and 5B, is mounted. Further, the reference chart of this embodiment has the same structure as shown in FIG. 7. Therefore, the explanations therefor will not be repeated.

To the image processing device 30, the image signals G and Q shot by the input device 1 are input, the observation-site illumination spectrum data is input from the observation-site illumination spectrum data storage unit 4, and the basis function data of the object is input from the object basis function storage unit 29. The observation-site illumination spectrum data consists of intensity values of observation-site illumination taken at an interval of 1 nm, in a wavelength range from 380 nm to 780 nm.

In the image processing device 30, the spectral reflectance and XYZ values of the object are estimated from these input data, the color chip expansion coefficient B pre-stored in the image processing device, the expansion coefficient O obtained by expanding the basis function of an object by the basis functions of the color chips, the color chip basis functions $vn(\lambda)$, and the color matching functions data. Further, RGB signals to be input to the CRT monitor, are output; the RGB signals are used for displaying the XYZ values of the object taken under the observation-site illumination, on the CRT monitor, using the characteristics data of the CRT monitor. The CRT monitor displays a color image of the object, as the RGB signal output from the image processing device is input thereto.

The structure of the image processing device will now be described in detail.

Figure 9:
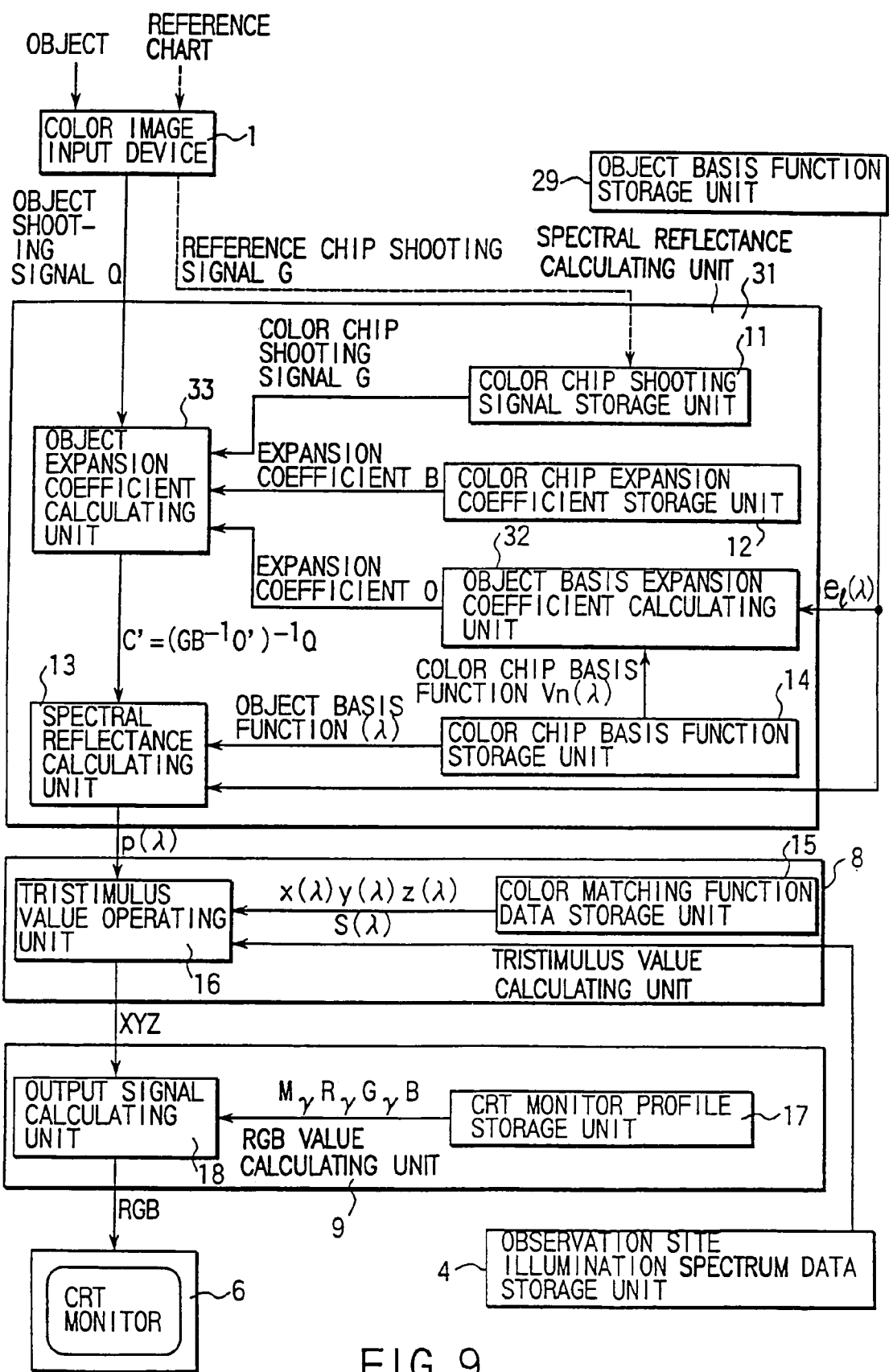
FIG. 9 is a diagram showing a detailed structure of a image processing device in the color image processing device according to the second embodiment.

As shown in FIG. 9, the image processing device 30 consists mainly of a spectral reflectance calculating unit 31, a tristimulus value calculating unit 8 and an RGB value calculating unit 9. Here, the structural elements of this embodiment, which are similar to those shown in FIG. 2, will be designated by the same reference numerals, and the detailed descriptions therefor will not be repeated.

The spectral reflectance calculating unit 31 includes a color chip shooting signal storage unit 11 for storing a color chip shooting signal, a color chip expansion coefficient storage unit 12 for storing an expansion coefficient B, a color chip basis function storage unit 14 for storing color chip basis functions $vn(\lambda)$ (n=1 to 10), an object basis expansion coefficient calculating unit 32 for calculating a expansion coefficient O, an object expansion coefficient calculating unit 33 for calculating an expansion coefficient C, and a spectral reflectance calculating unit 13 for calculating a spectral reflectance $p(\lambda)$ of an object.

In the spectral reflectance calculating unit 31 having the above described structure, the object shooting signal Q and reference chart shooting signal G output from the color image input device 1 are input to the object expansion coefficient calculating unit 33 and the color chip shooting signal storage unit 11 respectively. In the color chip shooting signal storage unit 11, from a reference chart image made of a plurality of color chips, average values of the shooting signals for all the color chips are calculated in an appropriate region, and the calculation result is stored as a color chip shooting signal. In the color chip expansion coefficient storage unit 12, expansion coefficients for the basis functions of the color chips within a reference color chip obtained in advance are stored.

In the object basis expansion coefficient calculating unit 32, on the basis of the color chip basis function $vn(\lambda)$ input from the color chip basis function storage unit 14 and the object basis functions $el(\lambda)$ input from the object basis function storage unit 29, the expansion coefficient O in the case of expanding the object basis function $el(\lambda)$ by the color basis function $vn(\lambda)$ is obtained.

In the object expansion coefficient calculating unit 33, on the basis of the object shooting signal Q input from the color image input device 1, the color chip shooting signal G input from the color chip shooting signal storage unit 11, the expansion coefficient B input from the color expansion coefficient storage unit 12 and the expansion coefficient O input from the object basis expansion coefficient calculating unit 32, the expansion coefficient C ($C=(GB^{-1}O)^{-1}Q$) in the case of expanding the reflectance of an object by the object basis function $el(\lambda)$ is calculated, and the calculation result is output to the spectral reflectance calculating unit 13. The spectral reflectance calculating unit 13 calculates the spectral reflectance $p(\lambda)$ of the object from the expansion coefficient C and the basis functions $el(\lambda)$ output from the object basis function storage unit 29.

Figure 10:
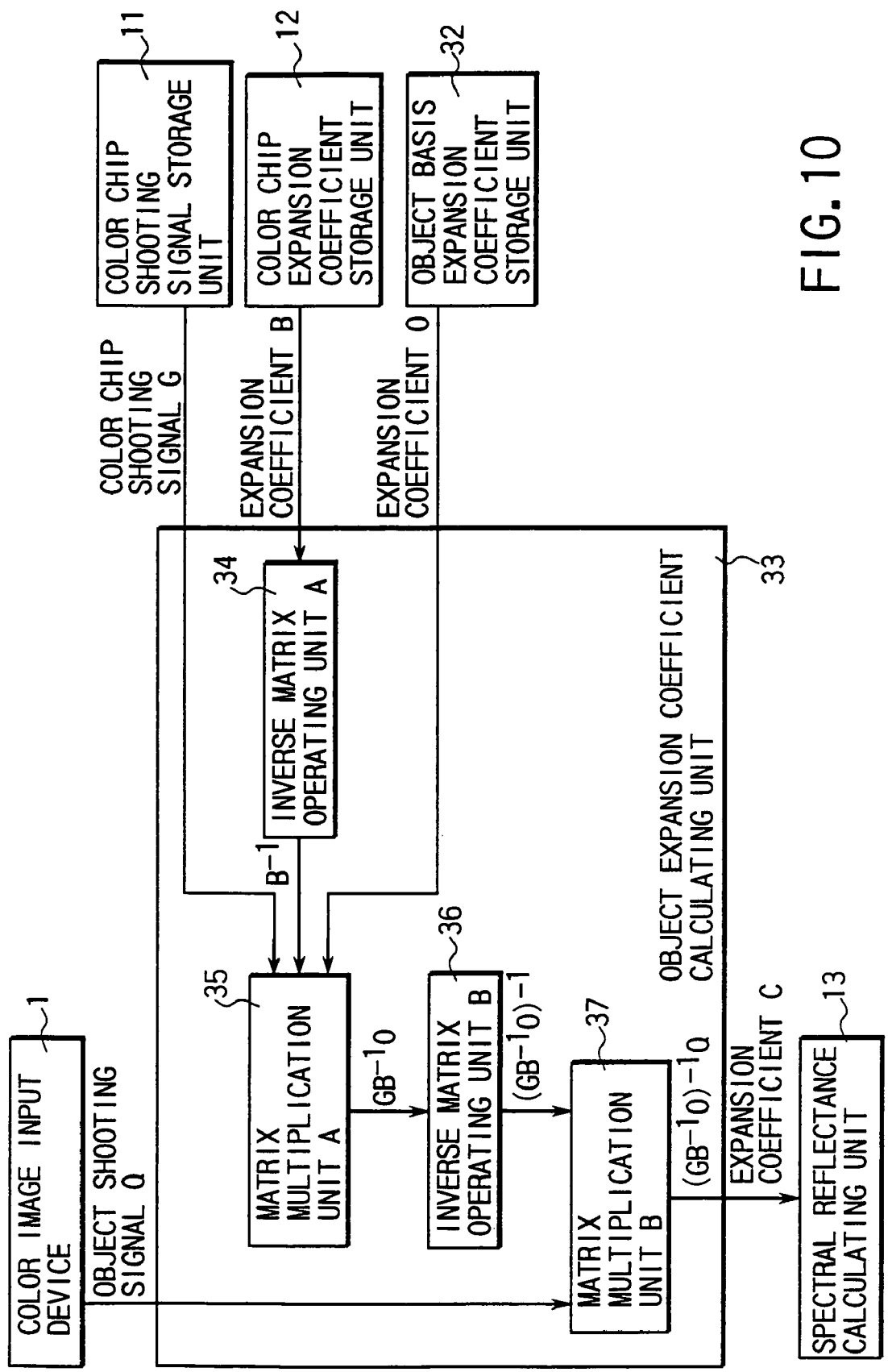
FIG. 10 is a diagram showing a structure of an object expansion coefficient calculating unit shown in FIG. 9.

FIG. 10 shows the structure of the object expansion coefficient calculating unit 33, which will now be described.

The inverse matrix $B^{-1}$ of the expansion coefficient B, which is calculated by the inverse matrix operating unit A34 from the expansion coefficient B input from the color chip expansion coefficient storage unit 12, the color chip shooting signal G input from the color chip shooting signal storage unit 11, and the expansion coefficient O input from the object basis expansion coefficient calculating unit 32 are input to the Matrix Multiplication Unit A35, and thus matrix $GB^{-1}O$ is calculated. The obtained matrix $GB^{-1}O$ is input to the inverse matrix operating unit B36, and thus an inverse matrix $(GB^{-1}O)^{-1}$ is obtained, which is further input to the matrix multiplication unit B37.

To the matrix multiplication unit B37, the object shooting signal Q is further input. With this input, and the inverse matrix $(GB^{-1}O)^{-1}$ output from the inverse matrix operating unit B36, the expansion coefficient of the object, $C=(GB^{-1}O)^{-1}Q$ is calculated, and the result of the calculation is output to the spectral reflectance calculating unit 13.

As shown in FIG. 9, in the spectral reflectance calculating unit 13, the spectral reflectance $p(\lambda)$ of the object is calculated on the basis of the expansion coefficient C calculated from the object expansion coefficient calculating unit 33 and the basis functions $el(\lambda)$ of the object, which is output from the object basis function storage unit 29.

Figure 11:
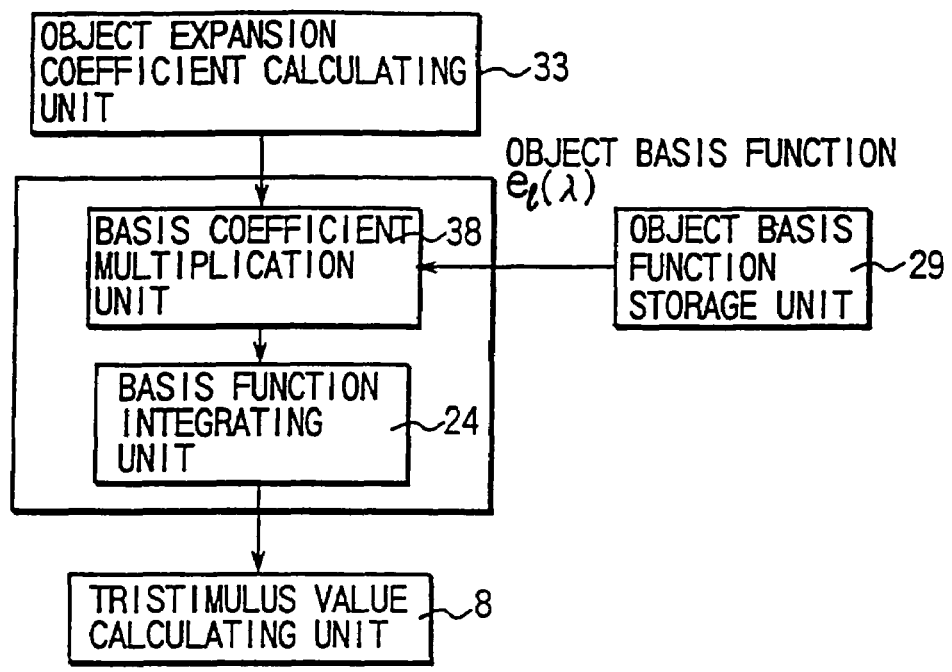
FIG. 11 is a diagram showing a structure of a spectral reflectance calculating unit shown in FIG. 9.

FIG. 11 shows the structure of the spectral reflectance calculating unit 13, which will now be described.

The spectral reflectance calculating unit 13 includes a basis coefficient multiplication unit 38 for multiplying the object basis functions $el(\lambda)$ with the corresponding object expansion coefficient C, and a basis function integrating unit 24 for calculating the spectral reflectance.

With the object expansion coefficients C input from the object expansion coefficient calculating unit 33 and the object basis functions $el(\lambda)$ input from the object basis function storage unit 29, the basis coefficient multiplication unit 38 multiples the object basis functions $el(\lambda)$ and the object expansion coefficients $C=cl$ (l=1 to 10) respectively, and the result of the calculation is output to the basis function integrating unit 24. The basis function integrating unit 24 adds up the data input from the basis coefficient multiplication unit 38 with regard to all of the basis functions $clel(\lambda)$ (l=1 to 10) for each wavelength, and the result is output to the tristimulus value calculating unit 8.

In the tristimulus value calculating unit 8 shown in FIG. 9, the tristimulus value operating unit 16 calculates the tristimulus values XYZ under the illumination condition for observing the object on the basis of the spectral reflectance of the object, calculated in the spectral reflectance calculating unit 13, the observation-site illumination spectrum data input from the observation-site illumination spectrum data storage unit 4 and the color matching functions data pre-stored in the color matching function data storage unit 15.

As shown in FIG. 6, the output signal calculating unit 18 converts the XYZ values calculated in the tristimulus value calculating unit 8 into an RGB signals to be input to the monitor, with use of the characteristics data of the CRT monitor, pre-stored in the CRT monitor profile storage unit 17.

The characteristics data of the CRT monitor includes a matrix M stored in the phosphor tristimulus value data storage unit 25 shown in FIG. 6 and gamma curves $\gamma^R \gamma^G \gamma^B$ stored in the RGB gradation characteristics data storage unit 26.

The matrix M is a matrix consisting of elements arranged in 3×3, and the gamma curves $\gamma^R \gamma^G \gamma^B$ is a output light intensity to respective input RGB values. The RGB signals output from the RGB value calculating unit 9 are input to the CRT monitor 6, and the color image of the object is displayed on the CRT monitor 6.

In the second embodiment, the spectral reflectance of an object is estimated from the object shooting signal Q and reference chart shooting signal G, shot by the color image input device, the color chip basis functions $vn(\lambda)$ which can expand the spectral reflectance of every color chip of the reference chart pre-stored, the expansion coefficient B of each color chip and the basis function $el(\lambda)$ of the spectral reflectance of the object.

As in the case of the first embodiment, the conditions for being able to estimate the spectral reflectance of an object without error are that the basis functions $el(\lambda)$ of the spectral reflectance of an object can be expanded by the color chip basis functions $vn(\lambda)$ of the reference chart, and that the color image input device has a certain number of bands, which is more than the number of basis functions of the spectral reflectances of the object. With these conditions, even if the spectral sensitivities of the color image input device and the illumination spectrum for shooting are not known, the spectral reflectance of the object can be estimated.

It should be noted that the second embodiment is different from the first one in that the number of bands which is required by the color image input device in order to accurately estimate the spectral reflectance of the object, is not the number of color chip basis functions, but the number of basis functions of the reflectance of the object.

In general, the number of basis functions of the spectral reflectance of the object is less than the number of basis functions of the spectral reflectances of the color chips, which can expand the basis function of the spectral reflectance of the object. Therefore, it becomes possible to estimate the spectral reflectance of the object by a camera having the less number of bands than that of the first embodiment. Further, a great number of color chips can be used to be able to expand the spectral reflectance of an object at high accuracy, while maintaining the number of bands of the camera for shooting an object equal to the number of basis functions of the spectral reflectance of the object. With use of the same method as in this embodiment, it is possible to accurately estimate the spectral reflectance of an object such as human skin, whose spectral reflectance can be reproduced by three basis functions at high accuracy, in the case of an ordinary three-band digital camera, as presented in the fifth embodiment.

Figure 12:
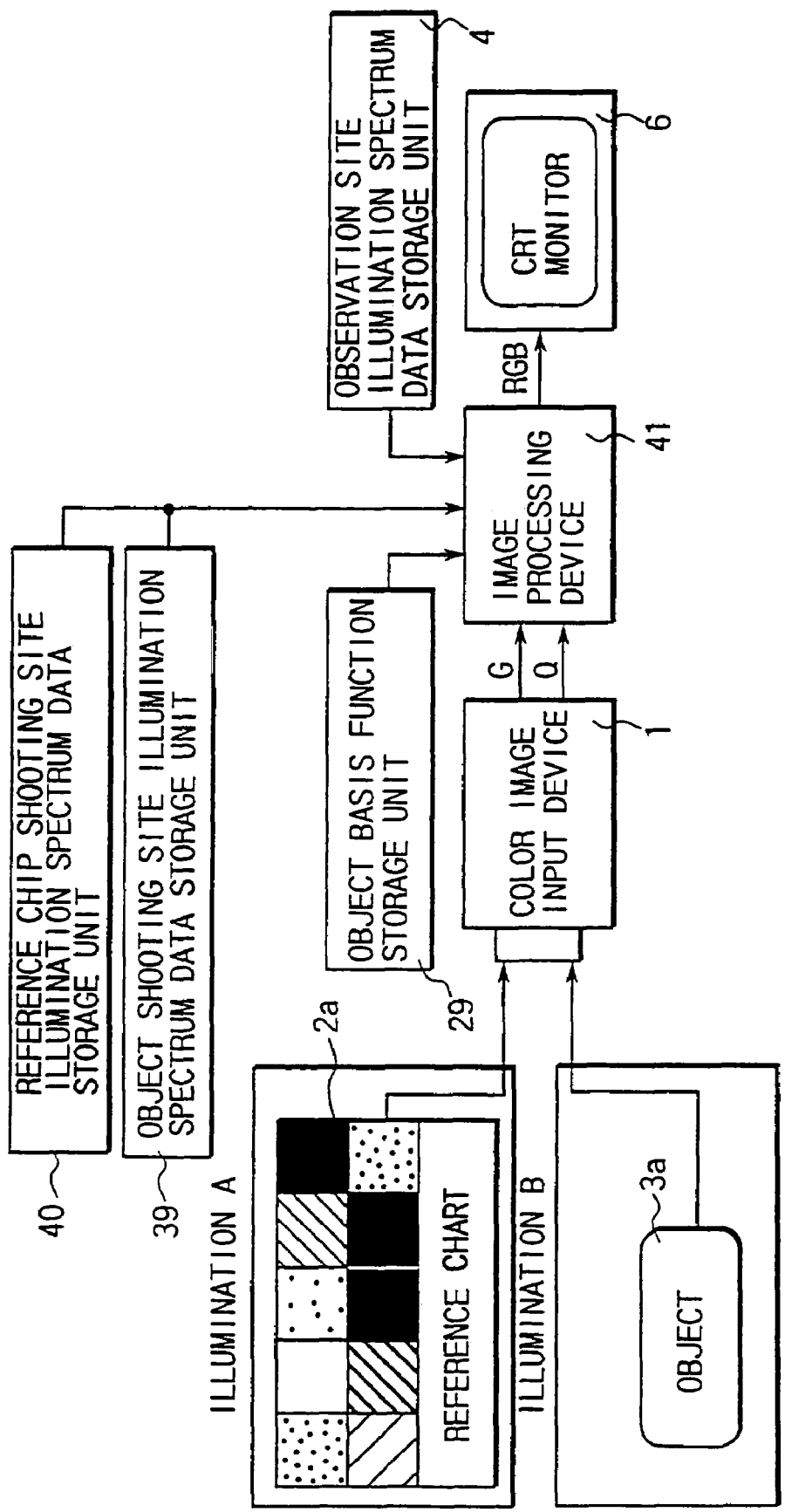
FIG. 12 is a diagram showing a structure of a color image processing device according to the third embodiment of the present invention.

FIG. 12 shows the structure of the color image processing apparatus according to the third embodiment of the present invention, which will now be described.

It should be noted that the structural elements of this embodiment which are equivalent to those shown in FIG. 8 are designated by the same reference numerals, and the detailed explanations therefor will be omitted.

The device of this embodiment includes a color image input device 1 for inputting a color image by shooting or the like, a reference chart 2a placed under illumination A, an object 3a placed under illumination B different from the illumination A, an observation-site illumination spectrum data storage unit 4 for storing observation-site illumination spectrum data, an object basis function storage unit 29 for storing an object basis function $el(\lambda)$, an object shooting-site illumination spectrum data storage unit 39 for storing object shooting-site illumination spectrum data, which will be explained later, a reference chart shooting-site illumination spectrum data storage unit 40 for storing reference chart shooting-site illumination spectrum data, an image processing device 41 for estimating a spectral reflectance and an XZY values of an object 3a from image signals G and Q of the reference chart 2a and object which are shot, and for outputting RGB signals, and a CRT monitor 6 for displaying the XYZ values of the object under the observation-site illumination, from the RGB signals.

The input device 1 is equivalent to the input device of the first embodiment, and a filter turret on which interference filters shown in FIG. 5 are arranged is mounted in the input device 1. Further, this embodiment has an equivalent structure to that shown in FIG. 7 in terms of the reference chart, and therefore the explanations therefor will not be repeated. The illumination spectrum data are intensity values of illumination taken at an interval of 1 nm within a wavelength range of 380 nm to 780 nm. The basis functions data of the object are input from the object basis function storage unit 29.

The image processing device 41 estimates the spectral reflectance and XYZ values of an object from the above-described inputs, the color chip expansion coefficient B pre-stored in the image processing device, the expansion coefficient O' obtained by expanding the products of the basis functions of the object and the object shooting-site illumination spectrum by the products of the basis functions of the color chips and the reference chart shooting-site illumination spectrum, the basis functions $el(\lambda)$ of the object and the color matching function data. Further, with reference to the characteristics data of the CRT monitor 6, the device 41 outputs the XYZ values of the object under the observation-site illumination, as RGB signals, to the CRT monitor 6. The CRT monitor 6 displays the color image of the object on the basis of the RGB signals.

Figure 13:
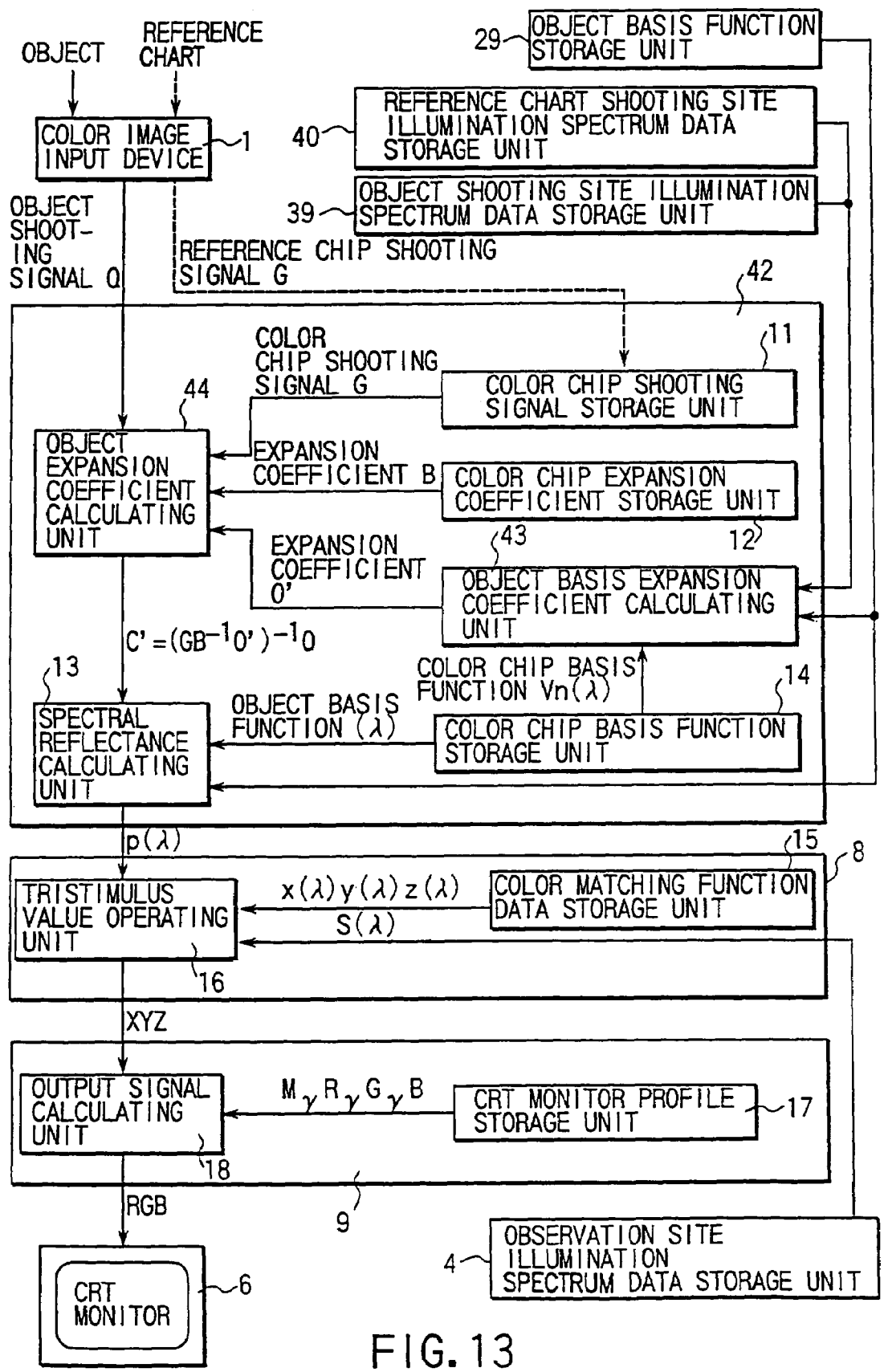
FIG. 13 is a diagram showing a detailed structure of an image processing device in the color image processing device according to the third embodiment.

FIG. 13 shows an example of the structure of the image processing device 41, which will now be described.

The image processing device 41 consists mainly of a spectral reflectance calculating unit 42, a tristimulus value calculating unit 8 and an RGB-value calculating unit 9. Here, the structural elements of this embodiment, which are similar to those shown in FIG. 9, will be designated by the same reference numerals, and the detailed descriptions therefor will not be repeated.

The spectral reflectance calculating unit 42 includes a color chip shooting signal storage unit 11 for storing a color chip shooting signal, a color chip expansion coefficient storage unit 12 for storing an expansion coefficient B, a color chip basis function storage unit 14 for storing color chip basis functions $vn(\lambda)$ (n=1 to 10), an object basis expansion coefficient calculating unit 43 for calculating a expansion coefficient O', an object expansion coefficient calculating unit 44 for calculating an expansion coefficient C', and a spectral reflectance calculating unit 13 for calculating a spectral reflectance p(λ) of an object from the expansion coefficient C' and the color chip basis functions vn(λ) output from the object basis function storage unit 29.

The object basis expansion coefficient calculating unit 43 calculates an expansion coefficient O' of the case where the products of the object basis functions el(λ) and the object shooting-site illumination spectrum, that is, el(λ)·So(λ), is expanded by the products of the color chip basis functions vn(λ) and the reference chart shooting-site illumination spectrum, that is, vn(λ)·Sc(λ).

The object expansion coefficient calculating unit 44 calculates an expansion coefficient C' (C'=(GB$^{-1}$O')$^{-1}$Q) on the basis of the object shooting signal Q, the color chip shooting signal G, the expansion coefficient B and the expansion coefficient O'.

Figure 14:
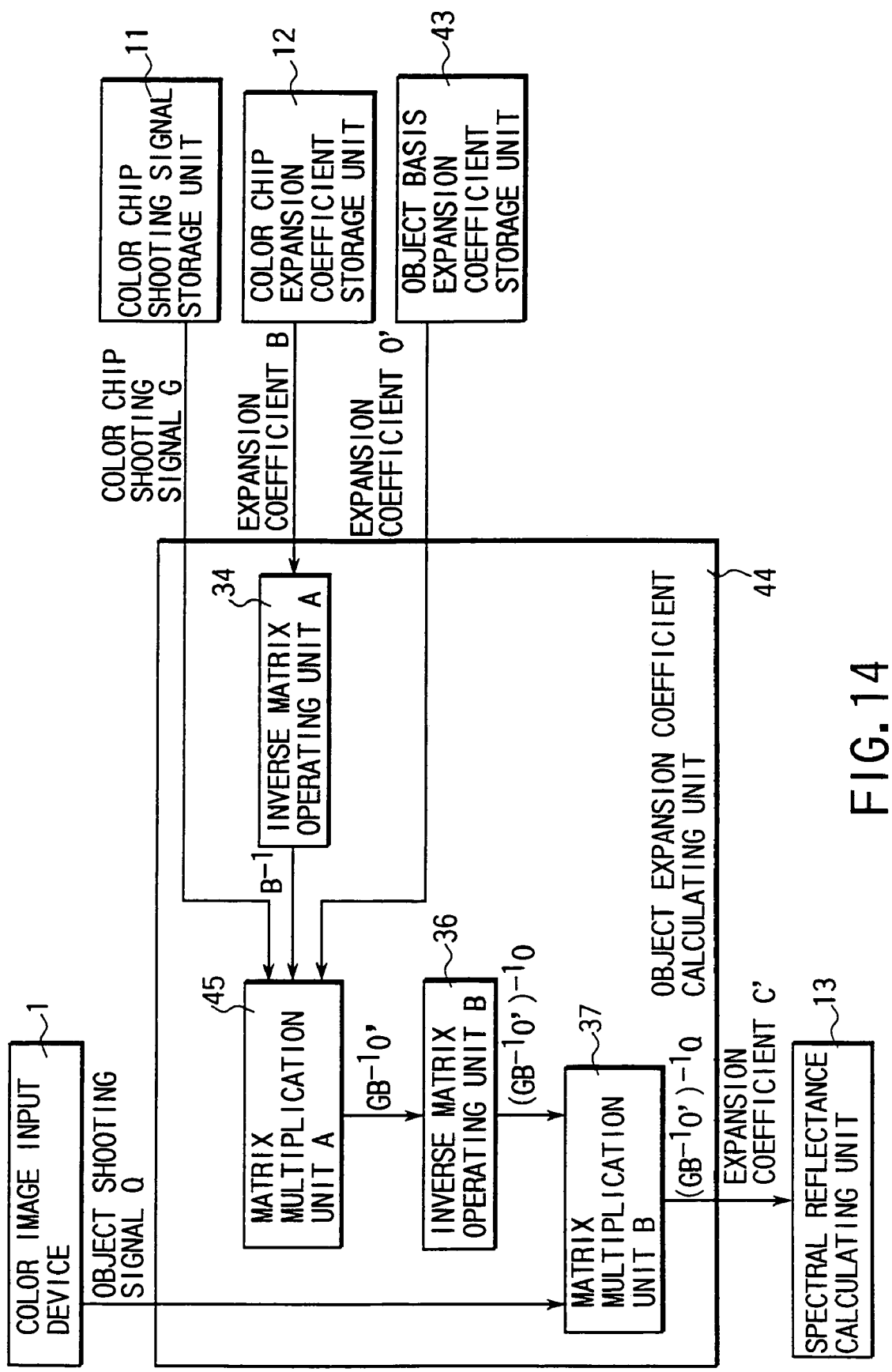
FIG. 14 is a diagram showing a structure of an object expansion coefficient calculating unit shown in FIG. 13.

FIG. 14 shows the structure of the object expansion coefficient calculating unit 44, which will now be described.

Here, the structural elements of this embodiment, which are similar to those shown in FIG. 10, will be designated by the same reference numerals, and the detailed descriptions therefor will not be repeated.

The inverse matrix B$^{-1}$ of the expansion coefficient B, which is calculated by the inverse matrix operating unit A34 from the expansion coefficient B input from the color chip expansion coefficient storage unit 12, the color chip shooting signal G input from the color chip shooting signal storage unit 11, and the expansion coefficient O' input from the object basis expansion coefficient calculating unit 43 are input to the matrix multiplication unit A45, and thus matrix GB$^{-1}$O' is calculated. The obtained matrix GB$^{-1}$O' is input to the inverse matrix operating unit B36, and thus an inverse matrix (C=(GB$^{-1}$O')$^{-1}$) is obtained, which is further input to the matrix multiplication unit B37.

To the matrix multiplication unit B37, the object shooting signal Q is further input. With this input, and the inverse matrix (GB$^{-1}$O')$^{-1}$ output from the inverse matrix operating unit B36, the expansion coefficient of the object, C' is calculated, and the result of the calculation is output to the spectral reflectance calculating unit 13.

As shown in FIG. 13, in the spectral reflectance calculating unit 13, the spectral reflectance p(λ) of the object is calculated on the basis of the expansion coefficient C' calculated from the object expansion coefficient calculating unit 44 and the basis functions el(λ) of the object, which are output from the object basis function storage unit 29. Then, the result of the calculation is output to the tristimulus value calculating unit 8.

It should be noted that the spectral reflectance calculating unit 13 has the same structure as illustrated in FIG. 11, and therefore the explanation of this unit will not be repeated.

The tristimulus value calculating unit 8 calculates the tristimulus values XYZ under the illumination condition for observing the object 3a on the basis of the spectral reflectance of the object, calculated in the spectral reflectance calculating unit 42, the observation-site illumination spectrum data input from the observation-site illumination spectrum data storage unit 4 and the color matching functions data pre-stored in the color matching function data storage unit 15. Then, the calculated value is output to the output signal calculating unit 18.

The output signal calculating unit 18 converts the XYZ values calculated in the tristimulus value calculating unit 8 into RGB signals to be input to the monitor, with use of the characteristics data of the CRT monitor 6, pre-stored in the CRT monitor profile storage unit 17. Thus, the color image is displayed on the CRT monitor 6.

In the third embodiment, the spectral reflectance of an object is estimated from the object shooting signal Q and reference chart shooting signal G, shot by the color image input device under different illumination conditions, the color chip basis functions vn(λ) which can expand the spectral reflectance of every color chip of the reference chart pre-stored, the expansion coefficient B of each color chip, the basis function of the spectral reflectance of the object, the reference chart shooting-site illumination spectrum data and the object shooting-site illumination data. Here, the conditions for being able to estimate the spectral reflectance of an object without error are that the products of the basis functions of the spectral reflectance of the object and the object shooting-site illumination spectrum, can be expanded by the products of the color chip basis functions vn(λ) of the spectral reflectance of reference chart and the reference chart shooting-site illumination spectrum, and that the color image input device has a certain number of bands, which is more than the number of basis functions of the spectral reflectance of the object.

With these conditions, even if the spectral sensitivities of the color image input device are not known, the spectral reflectance of the object can be estimated. The third embodiment is different from the second one mainly in the following point. That is, even if the reference chart shooting-site illumination and the object shooting-site illumination are different from each other, the spectral reflectance of an object can be accurately estimated when the spectra of these illumination are known and the above conditions are satisfied.

In this embodiment, the color chips image is shot in advance under a known illumination source and stored. Therefore, it becomes possible to estimate the spectral reflectance of an object when shooting the object with use of the same color image input device for shooting the color chips, without shooting the color chips.

Next, a color image processing apparatus according to the fourth embodiment of the present invention will now be described.

Figure 15:
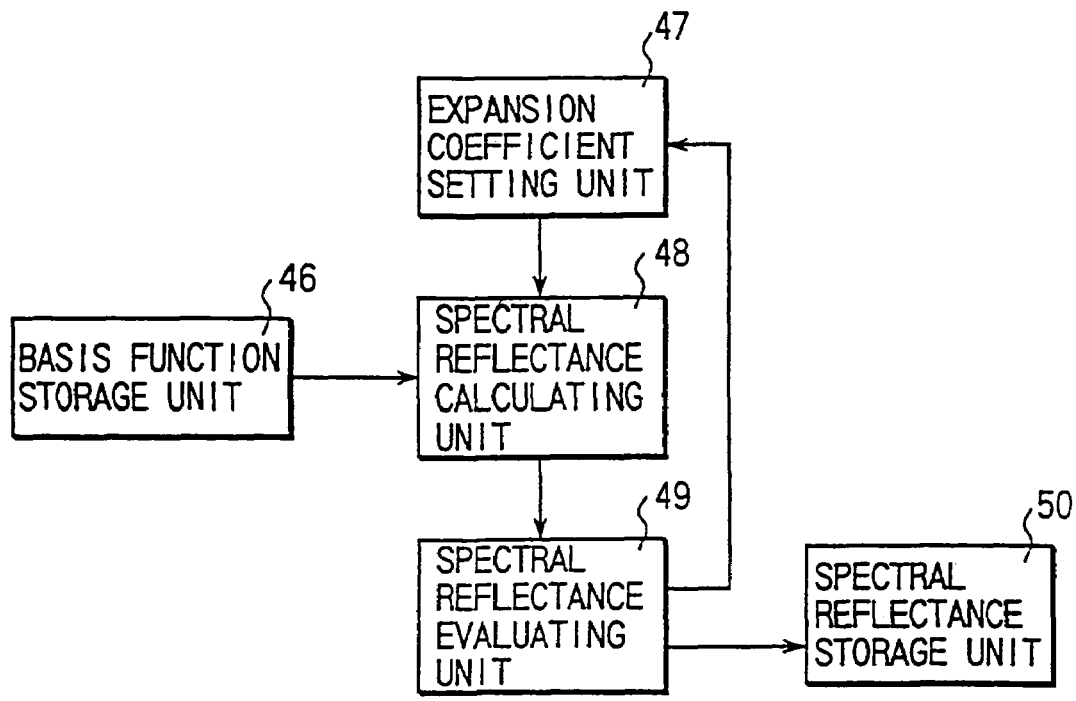
FIG. 15 is a diagram showing a structure of a color image processing device according to the fourth embodiment of the present invention.

As shown in FIG. 15, the color image processing apparatus includes a basis function storage unit 46 for storing basis functions of the spectral reflectance of human skin, an expansion coefficient setting unit 47 for setting an expansion coefficient corresponding to a basis function, a spectral reflectance calculating unit 48 for calculating a spectral reflectance, a spectral reflectance evaluating unit 49 for judging if a calculated spectral reflectance satisfies an evaluation condition, and a spectral reflectance storage unit 50 for storing a spectral reflectance which satisfies an evaluation condition.

In the basis function storage unit 46, the basis functions of the spectral reflectance of the human skin, which has values at an interval of 1 nm within a wavelength range from 380 nm to 780 nm. The number of basis functions stored in the basis function storage unit 46 is determined in accordance with the contribution rate of the basis function obtained by principal component analysis of a great number of the spectral reflectances of human skin measured in advance by the measurement instrument. The M-number of basis functions which are required to achieve a contribution rate of 99.9999% or more, are stored.

The expansion coefficient setting unit 47 sets a expansion coefficient Cm (m=1 to M) which corresponds to a respective one of the M-number of basis functions.

The spectral reflectance calculating unit 48 calculates the spectral reflectance from the data input thereto, that is, the M-number of basis functions stored in the basis function storage unit 46 and the M-number of expansion coefficients set by the expansion coefficient setting unit 47.

The spectral reflectance evaluation unit 49, to which the spectral reflectance calculated by the spectral reflectance calculating unit 48 is input, judges if the spectral reflectance satisfies the evaluation condition preset in the spectral reflectance evaluation unit 49. If the condition is satisfied, the spectral reflectance is output to the spectral reflectance storage unit 50, whereas if the condition is not satisfied, the expansion coefficient is reset in the expansion coefficient setting unit 47. This operation is repeated until the M-number of spectral reflectances are output.

Figure 16:
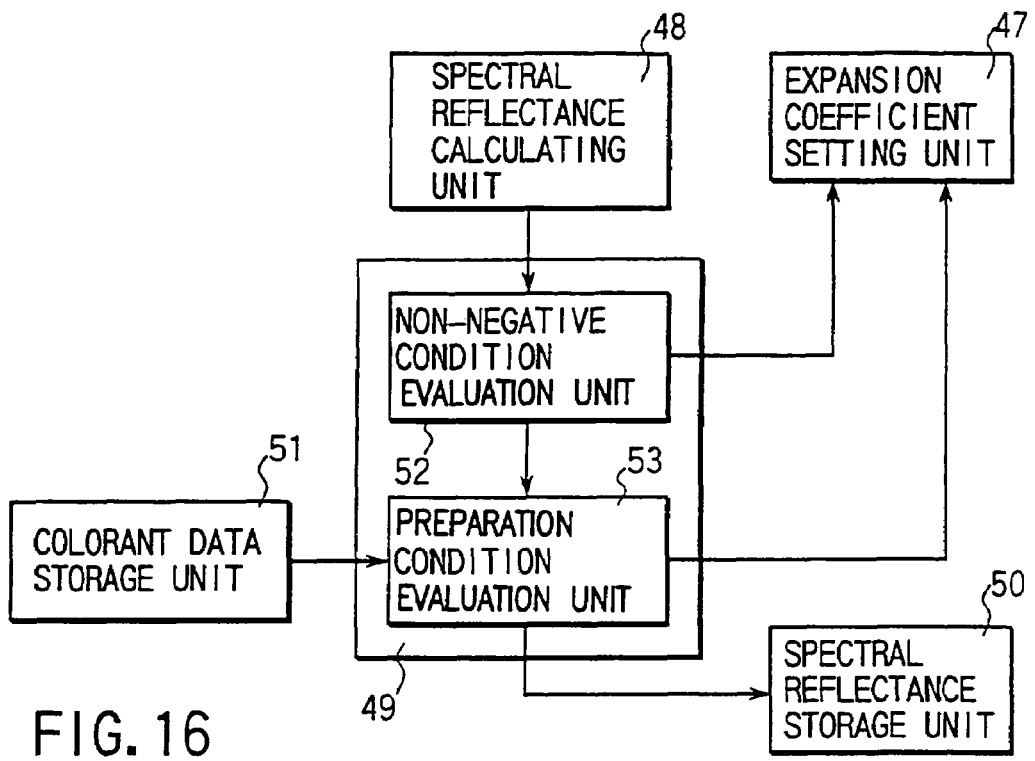
FIG. 16 is a diagram showing a structure of a spectral reflectance evaluating unit shown in FIG. 15.

Next, the spectral reflectance evaluation unit 49 will now be described in detail with reference to FIG. 16.

The spectral reflectance evaluation unit 49 includes a non-negative condition evaluation unit 52 and a preparation condition evaluation unit 53. With this structure, the spectral reflectance calculated by the spectral reflectance calculating unit 48 is input thereto, and whether or not the spectral reflectance has a negative value is examined in the non-negative condition evaluation unit 52.

Here, in the case where there is no negative value within a wavelength range from 380 nm to 780 nm, the spectral reflectance data is sent to the preparation condition evaluation unit 53, whereas in the case where there is a negative value in the range, negative value wavelength data is output to the expansion coefficient setting unit 47.

The preparation condition evaluation unit 53 evaluates whether or not the spectral reflectance data sent from the non-negative condition evaluation unit 52 can be designed with available colorant which are stored as a data base in the colorant data storage unit 51 at an accuracy within an allowable error range.

The colorant data storage unit 51 stores the diffusion coefficient and absorption coefficient of available colorant in the form of data base.

As the diffusion coefficient and absorption coefficient of a colorant is input from the colorant data storage unit to the preparation condition evaluation unit, the spectral reflectance closest to the one which can be designed from these data is calculated.

In the case where the spectral reflectance sent from the non-negative condition evaluation unit 52 satisfies an accuracy within an allowable error range for the spectral reflectance data which can be designed by these colorant, the spectral reflectance data is stored in the spectral reflectance storage unit 50. In the case where the data cannot be designed it is output as design error data to the expansion coefficient setting unit 47.

The expansion coefficient setting unit 47 resets the expansion coefficient Cm (m=1 to M) on the basis of the data sent from the non-negative condition evaluation unit 52 and the preparation condition evaluation unit 53.

When the color chip having a spectral reflectance prepared in this embodiment is used as an object whose spectral reflectance is known in the first to third embodiments, it becomes possible to estimate the spectral reflectance of an object at higher accuracy.

Next, a color image processing apparatus according to the fifth embodiment of the present invention will now be described.

Figure 17:
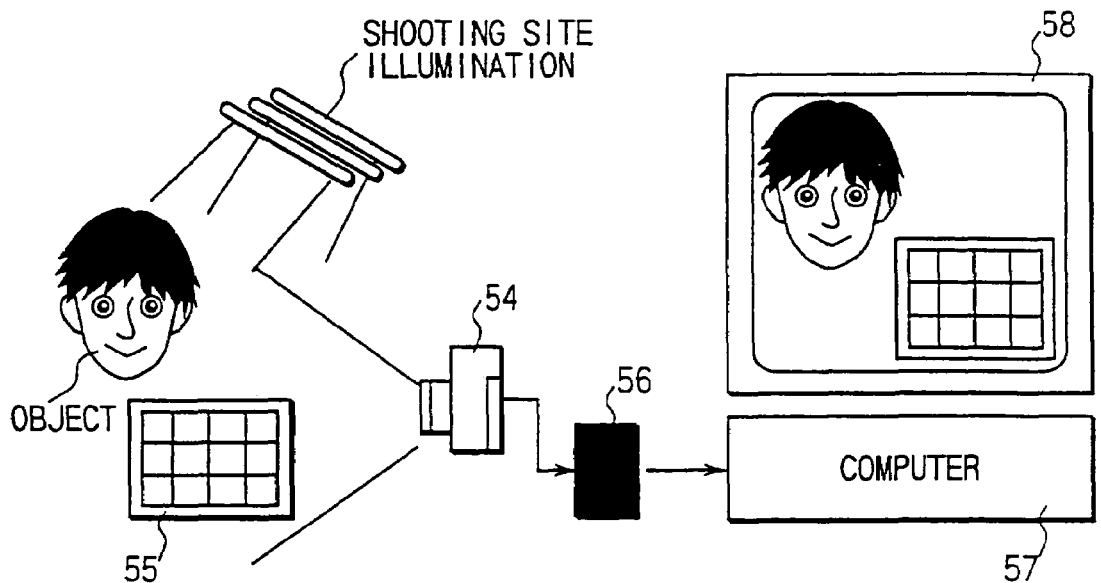
FIG. 17 is a diagram showing a structure of a color image processing device according to the fifth embodiment of the present invention.

FIG. 17 schematically shows the structure of the embodiment.

In this structure, an object (human image) shot by the digital camera 54 and an image of the reference chart 55 prepared for human skin, which were taken under the shooting-site illumination are shot as one image.

Then, the shooting image data is written in a memory card 56 provided within the digital camera 54. In the memory card 56, basis functions of spectral reflectances of the color chips of the reference chart 55 which are read in advance in the digital camera 54 from the chart data record memory card attached to the reference chart 55, the expansion coefficients for the bases of the color chips and the basis functions of the spectral reflectances of human skin color are written as header data of shooting image data. The image data or various data are read from the memory card 56 mounted in the personal computer 57 so as to perform the above-described process. The data are converted into RGB image data and displayed on the monitor 58.

Figure 18:
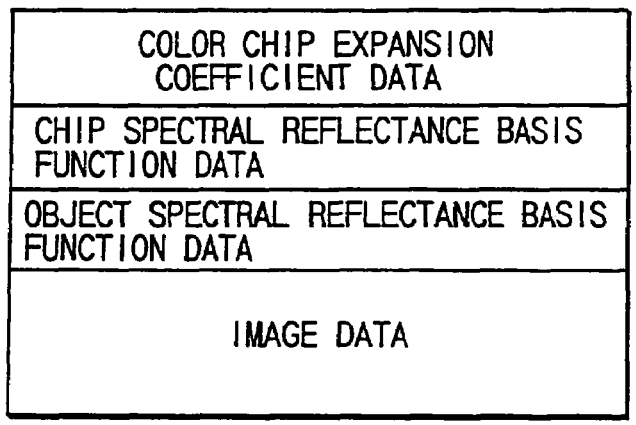
FIG. 18 is a diagram showing a concept of a format of shot image data stored on a memory card.

FIG. 18 is a diagram showing the concept of the format of the shooting image data stored in the memory card 56.

Color chip expansion coefficient data, chart spectral reflectance basis function data and object spectral reflectance basis function data are recorded in the card as header data of one piece of image data. After the header data, the image data is recorded as RGB image data for each pixel. Each RGB channel is data of 1 byte.

Figure 19:
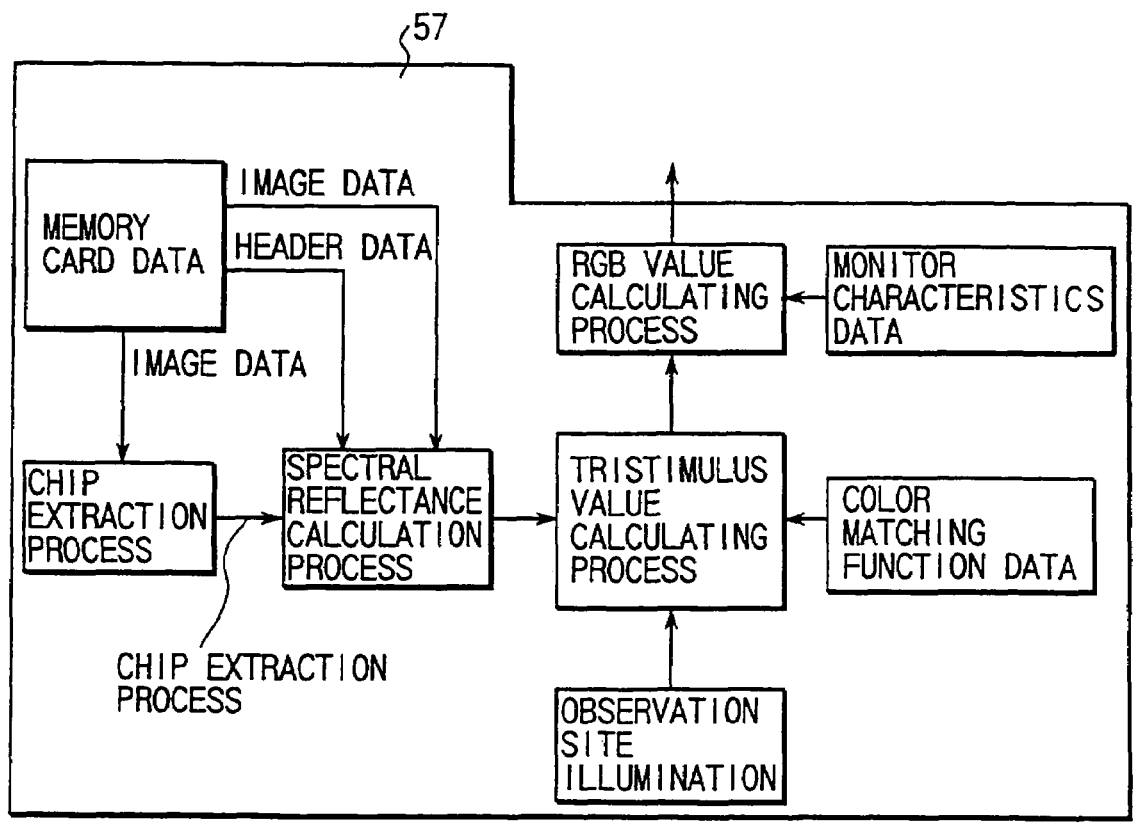
FIG. 19 is a diagram illustrating a color conversion process in the fifth embodiment.

FIG. 19 is a diagram illustrating the concept of the color conversion process.

The image data (RGB) signal read from the memory card 56 to the personal computer 57 are converted into the spectral reflectance of the object from color chip expansion coefficient data recorded as image header data, chip spectral reflectance basis function data, object spectral reflectance basis function data, and chart shooting data.

The spectral reflectance is converted into XYZ values with use of observation-site illumination data and color matching functions stored in the computer, and further converted into RGB image data to be input to a monitor, using the monitor characteristics data, to be displayed as a color image on the CRT monitor.

As described above, the color image processing apparatus of the present invention can estimate the spectral reflectance of an object from the object shooting signal Q and reference chart shooting signal G, shot by the color image input device under the same illumination condition, the color chips basis functions $vn(\lambda)$ which can expand the spectral reflectances of every color chip of the reference chart pre-stored, the expansion coefficient B of each color chip, and the basis functions of the spectral reflectance of the object. In the present invention, the conditions for being able to estimate the spectral reflectance of an object without error are that the basis functions of the spectral reflectance of the object can be expanded by the color chip basis functions $vn(\lambda)$ of the reference chart, and that the color image input device has a certain number of bands, which is more than the number of basis functions of the spectral reflectances of the object.

With these conditions, even if the spectral sensitivities of the color image input device and the shooting-site illumination spectrum are not known, the spectral reflectance of the object can be estimated.

Thus, according to the present invention, it is possible to provide a color image processing apparatus for estimating the spectral reflectance of the object from the color image signal of the object, obtained by the input device even if the spectral sensitivities of the input device and the shooting-site illumination spectrum used when the color image signal is input are not known.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A color image processing apparatus comprising:
   means for processing an input color image signal of an object in order to reproduce color data of the object;
   means for adding, as header data, to the obtained color image signal of the object: (i) a color image signal of a reference matter that has a known spectral reflectance, said color image signal being obtained using a same lighting condition used in photographing the object to obtain the color image signal of the object, (ii) spectral reflectance data of the reference matter, and (iii) known data of spectral reflectance of the object; and
   means for storing the color image signal with the header data added thereto as image data.

2. The color image processing apparatus according to claim 1, wherein the spectral reflectance data of the reference matter is a basis function of the spectral reflectance of the reference matter and an expansion coefficient for the basis function of the reference matter.

3. The color image processing apparatus according to claim 1, wherein the known data of spectral reflectance of the object is a basis function of a spectral reflectance of the object.

4. A color image processing apparatus comprising:
   means for processing an input color image signal of an object in order to reproduce color data of the object;
   means for adding, as header data, to a color image obtained by photographing the object and a reference matter having a known spectral reflectance at a same time in a same frame: (i) spectral reflectance data of the reference matter, and (ii) known data of spectral reflectance of the object; and
   means for storing the color image with the header data added thereto as image data.

5. The color image processing apparatus according to claim 4, wherein the spectral reflectance data of the reference matter is a basis function of the spectral reflectance of the reference matter and an expansion coefficient for the basis function of the reference matter.

6. The color image processing apparatus according to claim 4, wherein the known data of spectral reflectance of the object is a basis function of a spectral reflectance of the object.

7. The color image processing apparatus according to claim 1, wherein the reference matter comprises a color chart including a plurality of colors.

8. The color image processing apparatus according to claim 2, wherein the reference matter comprises a color chart including a plurality of colors.

9. The color image processing apparatus according to claim 3, wherein the reference matter comprises a color chart including a plurality of colors.

10. The color image processing apparatus according to claim 4, wherein the reference matter comprises a color chart including a plurality of colors.

11. The color image processing apparatus according to claim 5, wherein the reference matter comprises a color chart including a plurality of colors.

12. The color image processing apparatus according to claim 6, wherein the reference matter comprises a color chart including a plurality of colors.

13. An image data storage method for use in a color image processing apparatus for reproducing color data of an object, said method comprising:
   obtaining a color image signal of the object;
   obtaining a color image signal of a reference matter having a known spectral reflectance, by photographing the reference matter using a same lighting condition used in obtaining the color image signal of the object;
   adding, as header data, to the obtained color image signal of the object: (i) the color image signal of the reference matter, (ii) spectral reflectance data of the reference matter; and (iii) known data of spectral reflectance of the object; and
   storing the color image signal of the object with the header data added thereto as image data.

14. The image data storing method according to claim 13, wherein the spectral reflectance data of the reference matter is a basis function of the spectral reflectance of the reference matter and an expansion coefficient for the basis function of the reference matter.

15. The image data storing method according to claim 13, wherein the known data of spectral reflectance of the object is a basis function of a spectral reflectance of the object.

16. The image data storing method according to claim 13, wherein the reference matter comprises a color chart including a plurality of colors.

17. An image data storage method for use in a color image processing apparatus for reproducing color data of an object, said method comprising:
   photographing the object and a reference matter having a known spectral reflectance at a same time in a same frame to obtain a color image;
   adding, as header data, to the obtained color image:
   (i) spectral reflectance data of the reference matter, and
   (ii) known data of spectral reflectance of the object; and
   storing the color image of the object with the header data added thereto as image data.

18. The image data storing method according to claim 17, wherein the spectral reflectance data of the reference matter is a basis function of the spectral reflectance of the reference matter and an expansion coefficient for the basis function of the reference matter.

19. The image data storing method according to claim 17, wherein the known data of spectral reflectance of the object is a basis function of a spectral reflectance of the object.

20. The image data storing method according to claim 17, wherein the reference matter comprises a color chart including a plurality of colors.

* * * * *